US012501208B2

(12) United States Patent
Asada et al.

(10) Patent No.: US 12,501,208 B2
(45) Date of Patent: Dec. 16, 2025

(54) EARHOLE-WEARABLE SOUND COLLECTION DEVICE, SIGNAL PROCESSING DEVICE, AND SOUND COLLECTION METHOD

(71) Applicant: SONY GROUP CORPORATION, Tokyo (JP)

(72) Inventors: Kohei Asada, Kanagawa (JP); Shinpei Tsuchiya, Tokyo (JP); Daizen Kobayashi, Tokyo (JP); Koji Nageno, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/446,275

(22) Filed: Aug. 8, 2023

(65) Prior Publication Data

US 2023/0388703 A1 Nov. 30, 2023

Related U.S. Application Data

(60) Division of application No. 17/303,673, filed on Jun. 4, 2021, now Pat. No. 11,765,497, which is a (Continued)

(30) Foreign Application Priority Data

Dec. 8, 2011 (JP) ................................ 2011-268782

(51) Int. Cl.
*H04R 1/10* (2006.01)
*G10L 21/0232* (2013.01)
(Continued)

(52) U.S. Cl.
CPC .......... *H04R 1/406* (2013.01); *G10L 21/0232* (2013.01); *G10L 25/84* (2013.01); (Continued)

(58) Field of Classification Search
CPC ........ H04R 1/406; H04R 1/10; H04R 1/1016; H04R 1/1075; H04R 3/005; H04R 3/04; (Continued)

(56) References Cited

U.S. PATENT DOCUMENTS 3,270,146 A 8/1966 Everett et al.
4,354,065 A 10/1982 Buettner
(Continued)

FOREIGN PATENT DOCUMENTS

AU 2008207437 A1 8/2009
CN 101505447 A 8/2009
(Continued)

OTHER PUBLICATIONS

Office Action for EP Patent Application No. 17194727.8, issued on Sep. 30, 2019, 04 pages of Office Action.
(Continued)

*Primary Examiner* — Suhan Ni
(74) *Attorney, Agent, or Firm* — CHIP LAW GROUP

(57) ABSTRACT

The present technique relates to an earhole-wearable sound collection device, a signal processing device, and a sound collection method for realizing sound collection at a high S/N ratio, with noise influence being reduced not by a noise reduction process. In the earhole-wearable sound collection device, a microphone that collects emitted speech voice is provided in a space that is substantially sealed off from outside and connects to an ear canal of the wearer (the speaker). In a sound collection signal obtained through the ear canal, the emitted speech voice component is dominant over the noise component particularly at low frequencies. Therefore, the S/N ratio of an emitted speech voice collection signal can be improved by extracting the low-frequency component of the sound collection signal with the use of a LPF.

6 Claims, 16 Drawing Sheets

SECOND EMBODIMENT

Related U.S. Application Data continuation of application No. 15/883,667, filed on Jan. 30, 2018, now Pat. No. 11,070,910, which is a continuation of application No. 14/992,906, filed on Jan. 11, 2016, now Pat. No. 9,918,162, which is a continuation of application No. 14/360,948, filed as application No. PCT/JP2012/081054 on Nov. 30, 2012, now Pat. No. 9,237,392.

(51) Int. Cl.

| | |
|---|---|
| ***G10L 25/84*** | (2013.01) |
| ***H04R 1/40*** | (2006.01) |
| ***H04R 3/00*** | (2006.01) |
| ***H04R 3/04*** | (2006.01) |
| *H04R 11/02* | (2006.01) |
| *H04R 25/00* | (2006.01) |

(52) U.S. Cl.

CPC ............. *H04R 1/10* (2013.01); *H04R 1/1016* (2013.01); *H04R 1/1075* (2013.01); *H04R 3/005* (2013.01); *H04R 3/04* (2013.01); *H04R 11/02* (2013.01); *H04R 25/407* (2013.01); *H04R 2201/003* (2013.01); *H04R 2225/43* (2013.01); *H04R 2410/03* (2013.01); *H04R 2430/23* (2013.01)

(58) Field of Classification Search

CPC .............. H04R 25/407; H04R 2201/00; H04R 2225/43; H04R 2410/03; H04R 2430/23

See application file for complete search history.

(56) References Cited

U.S. PATENT DOCUMENTS

| | | | |
|---|---|---|---|
| 4,471,490 | A | 9/1984 | Bellafiore |
| 4,611,887 | A | 9/1986 | Glover et al. |
| 4,622,440 | A | 11/1986 | Slavin |
| 5,475,759 | A | 12/1995 | Engebretson |
| 5,991,419 | A | 11/1999 | Brander |
| 6,115,478 | A | 9/2000 | Schneider |
| 6,236,731 | B1 | 5/2001 | Schneider et al. |
| 6,240,192 | B1 | 5/2001 | Brennan et al. |
| 6,295,364 | B1 | 9/2001 | Finn et al. |
| 6,353,671 | B1 | 3/2002 | Kandel et al. |
| 7,651,278 | B2 | 1/2010 | Kiani et al. |
| 8,401,203 | B2 | 3/2013 | Sudo et al. |
| 8,565,459 | B2 | 10/2013 | Rasmussen |
| 8,594,353 | B2 | 11/2013 | Anderson |
| 2002/0176594 | A1 | 11/2002 | Hohmann et al. |
| 2003/0165300 | A1 | 9/2003 | Greub et al. |
| 2005/0135753 | A1 | 6/2005 | Eigenmann et al. |
| 2007/0230729 | A1 | 10/2007 | Naylor et al. |
| 2008/0056483 | A1 | 3/2008 | Sekine et al. |
| 2009/0016542 | A1 | 1/2009 | Goldstein et al. |
| 2009/0141698 | A1 | 6/2009 | Chao |
| 2009/0147982 | A1 | 6/2009 | Ashida et al. |
| 2009/0202091 | A1 | 8/2009 | Pedersen et al. |
| 2009/0220096 | A1 | 9/2009 | Usher et al. |
| 2011/0096939 | A1 | 4/2011 | Ichimura |
| 2011/0116666 | A1 | 5/2011 | Dittberner et al. |
| 2013/0039518 | A1 | 2/2013 | Goldstein et al. |

FOREIGN PATENT DOCUMENTS

| | | | |
|---|---|---|---|
| DK | 2088802 | T3 | 10/2013 |
| EP | 2088802 | A1 | 8/2009 |
| JP | 05-333899 | A | 12/1993 |
| JP | 08-214391 | A | 8/1996 |
| JP | 08-223677 | A | 8/1996 |
| JP | 2000-261534 | A | 9/2000 |
| JP | 2002-125298 | A | 4/2002 |
| JP | 2003-264883 | A | 9/2003 |
| JP | 2008-060938 | A | 3/2008 |
| JP | 2009-141698 | A | 6/2009 |
| JP | 4352932 | B2 | 10/2009 |
| JP | 2010-147982 | A | 7/2010 |
| JP | 2011-097268 | A | 5/2011 |
| WO | 2007/147049 | A1 | 12/2007 |
| WO | 2008/137870 | A1 | 11/2008 |

OTHER PUBLICATIONS

Extended European Search Report of EP Patent Application No. 17194727.8, issued on Jan. 17, 2018, 09 pages.

Office Action for CN Patent Application No. 201280058984.8, issued on Nov. 30, 2017, 09 pages of Office Action And 16 pages of English Translation.

Office Action for JP Patent Application No. 2016-179688, issued on Nov. 28, 2017, 07 pages of Office Action and 06 pages of English Translation.

Office Action for CN Patent Application No. 201280058984.8, issued on Aug. 29, 2016, 09 pages of Office Action and 14 pages of English Translation.

Office Action for JP Patent Application No. 2011-268782, issued on Jun. 14, 2016, 04 pages office action.

Office Action for JP Patent Application No. 2011-268782, issued on Nov. 17, 2015.

International Search Report and Written Opinion of PCT Application No. PCT/JP2012/081054, issued on Jan. 8, 2013, 15 pages of English translation and 11 pages of ISRWO.

International Preliminary Report on Patentability of PCT Application No. PCT/JP2012/081054, issued on Jun. 19, 2014, 13 pages of English Translation and 07 pages of IPRP.

Notice of Allowance for U.S. Appl. No. 14/992,906, issued on Jan. 31, 2018, 02 pages.

Notice of Allowance for U.S. Appl. No. 14/992,906, issued on Jan. 3, 2018, 02 pages.

Notice of Allowance for U.S. Appl. No. 14/992,906, issued on Dec. 13, 2017, 02 pages.

Notice of Allowance for U.S. Appl. No. 14/992,906, issued on Nov. 2, 2017, 05 pages.

Non-Final Office Action for U.S. Appl. No. 14/992,906, issued on Jul. 13, 2017, 11 pages.

Advisory Action for U.S. Appl. No. 14/992,906, issued on Jun. 8, 2017, 02 pages.

Final Office Action for U.S. Appl. No. 14/992,906, issued on Mar. 22, 2017, 09 pages.

Non-Final Office Action for U.S. Appl. No. 14/992,906, issued on Aug. 26, 2016, 09 pages.

Notice of Allowance for U.S. Appl. No. 14/360,948, issued on Sep. 3, 2015, 05 pages.

Non-Final Office Action for U.S. Appl. No. 14/360,948, issued on May 22, 2015, 06 pages.

Notice of Allowance for U.S. Appl. No. 15/883,667, issued on Mar. 10, 2021, 06 pages.

Non-Final Office Action for U.S. Appl. No. 15/883,667, issued on Dec. 1, 2020, 04 pages.

Non-Final Office Action for U.S. Appl. No. 15/883,667, issued on Nov. 25, 2019, 13 pages.

Non-Final Office Action for U.S. Appl. No. 15/883,667, issued on Feb. 7, 2019, 13 pages.

Final Office Action for U.S. Appl. No. 15/883,667, issued on Apr. 28, 2020, 12 pages.

Final Office Action for U.S. Appl. No. 15/883,667, issued on Jul. 10, 2019, 13 pages.

Advisory Action for U.S. Appl. No. 15/883,667, issued on Jun. 22, 2020, 02 pages.

Advisory Action for U.S. Appl. No. 15/883,667, issued on Sep. 17, 2019, 02 pages.

Notice of Allowance for U.S. Appl. No. 17/303,673, issued on May 12, 2023, 06 pages.

Non-Final Office Action for U.S. Appl. No. 17/303,673, issued on Oct. 31, 2022, 15 pages.

Non-Final Office Action for U.S. Appl. No. 15/883,667, issued on Feb. 7, 2019, 12 pages.

EARHOLE-WEARABLE SOUND COLLECTION DEVICE, SIGNAL PROCESSING DEVICE, AND SOUND COLLECTION METHOD

CROSS-REFERENCE TO RELATED APPLICATIONS

The present application is a divisional application of U.S. patent application Ser. No. 17/303,673, filed on Jun. 4, 2021, which is a continuation application of U.S. patent application Ser. No. 15/883,667, filed on Jan. 30, 2018, now U.S. Pat. No. 11,070,910, which is a continuation application of U.S. patent application Ser. No. 14/992,906, filed on Jan. 11, 2016, now U.S. Pat. No. 9,918,162, which is a continuation application of U.S. patent application Ser. No. 14/360,948, filed on May 28, 2014, now U.S. Pat. No. 9,237,392, which is a National Stage Entry of Patent Application No. PCT/JP2012/081054, filed on Nov. 30, 2012, which claims priority benefit of Japanese Patent Application No. JP 2011-268782, filed in the Japan Patent Office on Dec. 8, 2011. Each of the above-referenced applications is hereby incorporated herein by reference in its entirety.

TECHNICAL FIELD

The present technique relates to an earhole-wearable sound collection device that includes an attachment unit designed to have at least a portion to be inserted into an earhole portion, a signal processing device that performs signal processing on a sound collection signal generated by an internal microphone located in the attached unit, and a sound collection method.

CITATION LIST

Patent Document

Patent Document 1: Japanese Patent Publication No. 4,352,932

BACKGROUND ART

In recent years, information processing devices having verbal communication functions, such as so-called smartphones, have started spreading widely.

In an information processing device having such a verbal communication function, an earpiece microphone (an earphone integrated with a microphone) that enables hearing of received speech voice and collection of emitted speech voice is employed.

FIG. 16 shows an example of a general earpiece microphone that is currently spread (hereinafter referred to as the conventional earpiece microphone 100).

As shown in FIG. 16, in the conventional earpiece microphone 100, an earphone unit 101 for listening to received speech voice and a microphone 102A for collecting emitted speech voice are provided separately from each other. The earphone unit 101 is designed to be wearable in an ear of a wearer H, and includes a speaker for outputting received speech voice. In this earpiece microphone 100, an on-cord housing 102 is formed on the cord for transmitting signals to the earphone unit 101, and the microphone 102A is formed in this on-cord housing 102.

In the conventional earpiece microphone 100 having the above structure, speech voice emitted from the wearer (the speaker) reaches the microphone 102A via the outside (the external air), and is then collected.

SUMMARY OF THE INVENTION

Problems to be Solved by the Invention

In the conventional earpiece microphone 100 having the above structure, the microphone 102A for collecting emitted speech voice is exposed to the outside. That is, the microphone 102A is in direct contact with extraneous noise (environmental noise).

Therefore, with the conventional earpiece microphone 100, a relatively large amount of ambient noise is collected together with emitted speech voice, and the S/N ratio (signal-to-noise ratio) of emitted speech signals tends to become lower. As a result, it becomes difficult for the person at the other end of the line to hear the speech voice emitted from the wearer H.

To suppress the S/N ratio degradation due to noise, it is possible to perform a so-called noise reduction process to an emitted speech voice collection signal according to the SS (Spectrum Subtraction) method, for example.

However, a relatively large processing resource is required for performing such a noise reduction process, resulting in disadvantages in terms of product cost, power consumption, and the like.

Also, the noise reduction process involving nonlinear processing on the frequency axis according to the above mentioned SS method or the like normally has a problem of sound quality degradation after the processing.

The present technique has been developed in view of the above problems, and aims to realize sound collection with a high S/N ratio by reducing noise influence without the noise reduction process.

Solutions to Problems

To solve the above problems, an earhole-wearable sound collection device according to the present technique has the following structure. Specifically, the earhole-wearable sound collection device includes an attachment unit that is designed so that at least part of the attachment unit can be inserted into an earhole portion, and is designed to form a substantially sealed internal space therein when attached to the earhole portion, the internal space connecting to an ear canal.

The earhole-wearable sound collection device also includes an internal microphone that is located in the internal space of the attachment unit, and collects speech voice that is emitted by the wearer and propagates through the ear canal when the attachment unit is attached to the earhole portion.

The earhole-wearable sound collection device also includes either a low-frequency extraction filter unit that performs a filtering process on a sound collection signal from the internal microphone to extract a low-frequency component, or an equalizing unit that performs an equalizing process of a high-frequency emphasizing type on the sound collection signal from the internal microphone.

According to the present technique, a microphone (the internal microphone) that collects emitted speech voice is located in a space that is substantially sealed off from outside and connects to an ear canal of the wearer (the speaker). As the microphone is located in a space sealed off from outside, influence of noise can be effectively reduced. As emitted speech voice that propagates through an ear canal of the wearer is collected, the emitted speech voice can be collected at a higher S/N ratio than that in a case where a conventional earpiece microphone (FIG. 16) is employed to collect speech voice that is emitted from the wearer and propagates in the external air.

Furthermore, according to the present technique, the low-frequency extraction filter unit extracts the low frequency component of a sound collection signal generated by the internal microphone. As will be described later, when emitted speech voice propagating through an ear canal is collected, the emitted speech voice component is dominant over the extraneous noise component particularly in the low-frequency band of the sound collection signal.

Accordingly, with the above described filter unit, the S/N ratio of emitted speech voice collection signals can be further improved.

Alternatively, the equalizing unit is employed according to the present technique. With the equalizing unit, muffled voice to be generated when emitted speech voice propagating through an ear canal is collected is reduced, and the sound quality of emitted speech voice collection signals can be improved.

Effects of the Invention

According to the present technique, emitted speech voice can be collected at a higher S/N ratio than that with a conventional earpiece microphone that collects emitted speech voice propagating through the external air.

Also, according to the present technique, the noise reduction process for sound collection signals is unnecessary. As a result, an increase in the signal processing resource can be prevented, and advantages can be achieved in terms of production cost and power consumption.

MODE FOR CARRYING OUT THE INVENTION

The following is a description of embodiments according to the present technique.

Explanation will be made in the following order.

<1. Collection of Speech Voice via an Ear Canal>

<2. Signal Processing for Sound Quality Improvement>

<3. Further S/N Ratio Improvement by Low-Frequency Extraction>

[3-1. First Embodiment]

[3-2. Second Embodiment]

[3-3. Third Embodiment]

[3-4. Fourth Embodiment]

[3-5. Fifth Embodiment]

[3-6. Sixth Embodiment]

<4. Modifications>

1. Collection of Speech Voice Via an Ear Canal

Figures 1A, 1B:
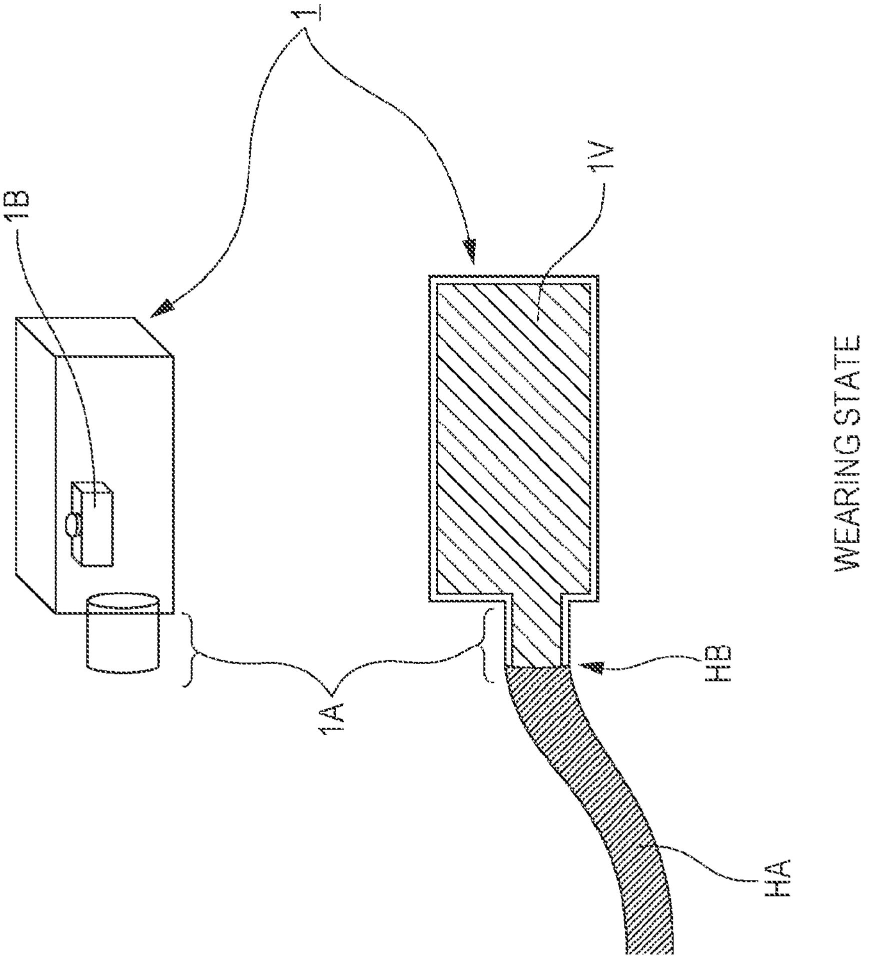
FIGS. 1A and 1B are diagrams for explaining the structure of an attachment unit in a sound collection system of an embodiment.

FIGS. 1A and 1B are diagrams for explaining the structure of an attachment unit 1 included in a sound collection system as an embodiment according to the present technique.

Specifically, FIG. 1A is a perspective view of the attachment unit 1, and FIG. 1B is a cross-sectional view showing the relations between an ear canal HA and an earhole portion HB of the wearer Hand the attachment unit 1 when the attachment unit 1 is attached to an ear of the wearer (the speaker) H.

First, the attachment unit 1 has an internal microphone 1B provided therein to collect speech voice of the wearer (the speaker) H.

In this example, the internal microphone 1B may be a MEMS (Micro Electro Mechanical Systems) microphone, with the installation space being taken into account.

The external shape of the attachment unit 1 is designed so that at least part of the attachment unit 1 can be inserted into an earhole portion of the wearer H, and accordingly, the attachment unit 1 can be attached to an ear of the wearer H. Specifically, the attachment unit 1 in this case includes an earhole insertion portion IA having such a shape that can be inserted into the earhole portion HB of the wearer H, and the earhole insertion portion IA is inserted into the earhole portion HB, so that the attachment unit 1 is attached to the ear of the wearer H.

The attachment unit 1 is designed so that an internal space IV connecting to the ear canal HA of the wearer H is formed as shown in FIG. 1B when the attachment unit 1 is attached to the wearer H.

At this point, the earhole insertion portion IA of the attachment unit 1 is covered with a material having elasticity in its surface portion like the earhole insertion portion of a canal-type earphone portion, so that contact with the earhole portion HB is achieved at the time of attachment.

Accordingly, at the time of attachment, the above described internal space IV becomes a space that is substantially sealed off from the outside.

The internal microphone IB is provided in this internal space IV.

Figure 2:
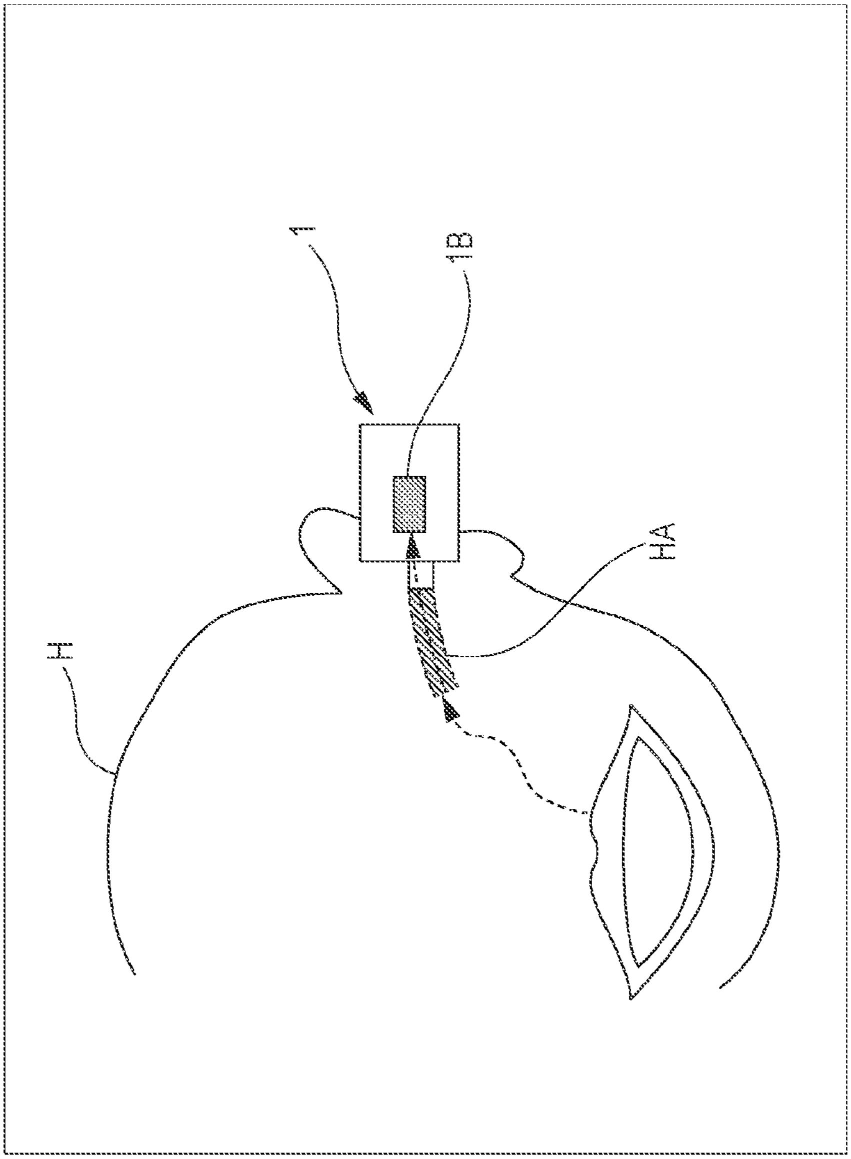
FIG. 2 is a diagram schematically showing collection of emitted speech voice by a sound collection system of an embodiment.

FIG. 2 is a diagram schematically showing collection of speech voice by the sound collection system of an embodiment including the attachment unit 1.

First, the sound collection system of this embodiment is based on the premise that collection of speech voice is performed while the attachment unit 1 is attached to an ear of the wearer H.

When the wearer H speaks while the attachment unit 1 is in an attached state, the vibrations accompanying the speaking are transmitted to the ear canal HA from the vocal cords of the wearer H via bones and the skin (as indicated by an arrow with a dashed line). As explained above with reference to FIGS. 1A and 1B, in the attached state, the internal space IV of the attachment unit 1 having the internal microphone IB provided therein connects to the ear canal HA, while being substantially sealed off from the outside.

Accordingly, the speech voice obtained via the ear canal HA of the wearer H as described above can be collected by the internal microphone IB.

In this sound collection system as an embodiment, as long as the inside of the housing of the attachment unit 1 maintains sufficient sealability, insulation against noise that propagates from the outside of the housing becomes sufficiently higher even in loud environments, and noise is effectively prevented from entering the internal microphone IB. Accordingly, speech voice can be collected at a higher S/N ratio (signal-to-noise ratio) than that with the conventional earpiece microphone 100 (see FIG. 13) that collects speech voice via the outside.

The sound insulation should be strong enough to cover at least the band of noise to be restrained, and, in that sense, completely hermetic sealing is not required.

2. Signal Processing for Sound Quality Improvement

In the sound collection system of this embodiment that collects speech voice that propagates via the ear canal HA and performs the sound collection while securing the sealability of the internal space IV having the internal microphone IB provided therein, speech voice can be collected at a higher S/N ratio than that with the conventional earpiece microphone 100.

However, in a case where the sealability is relatively high as in a case with a conventional canal-type earphone, for example, gain (response) in the ear canal HA becomes greater in lower bands than in a normal free space.

Therefore, the sound collection signal generated by the internal microphone IB has relatively high response characteristics in lower bands.

Due to this influence, transmitted speech voice based on the sound collection signal generated by the internal microphone IB is muffled in the lower bands, and is difficult for the person at the other end of the line to hear.

Figure 3A:
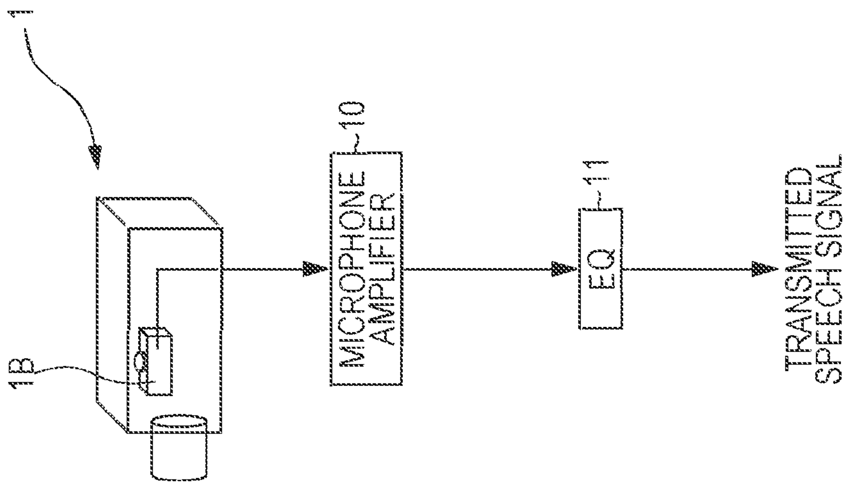
FIGS. 3A and 3B are diagrams for explaining the configuration of a signal processing system for sound quality improvement.

Therefore, to correct the sound collection signal response characteristics in the lower bands, it is preferable to provide a signal processing means as an equalizer (EQ) as shown in FIG. 3A.

Specifically, in the configuration shown in FIG. 3A, a collection sound signal generated by the internal microphone IB is amplified by the microphone amplifier 10, and an equalizing process (a characteristics correction process) is then performed by an equalizer 11.

Figure 4A:
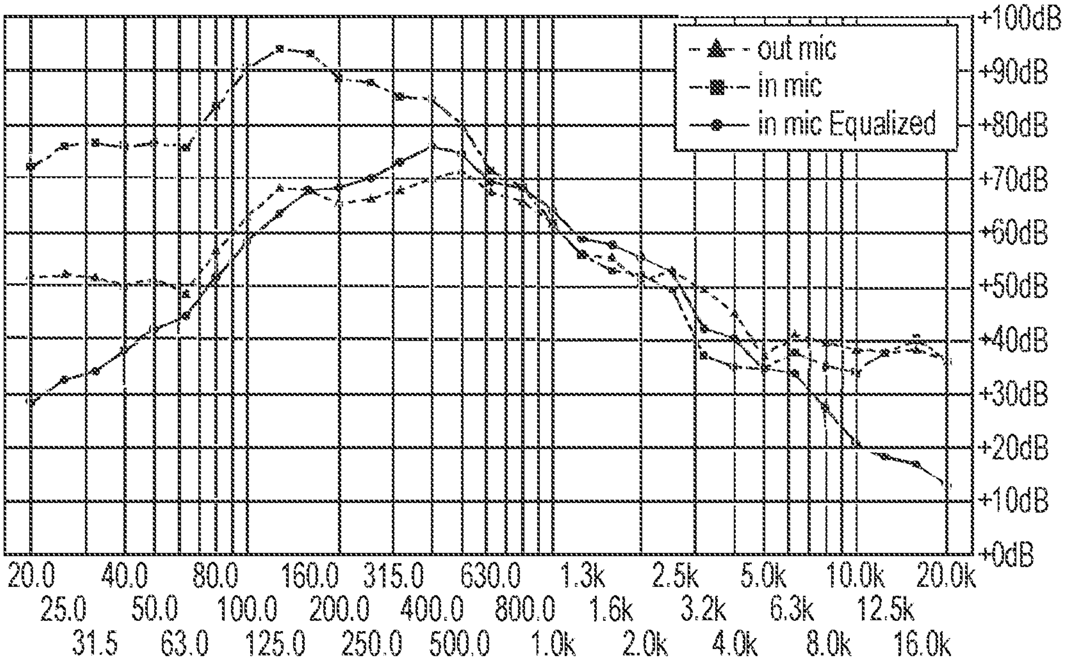
FIGS. 4A and 4B are diagrams for explaining specific frequency characteristics to be set in the equalizer for sound quality improvement.
Figure 4B:
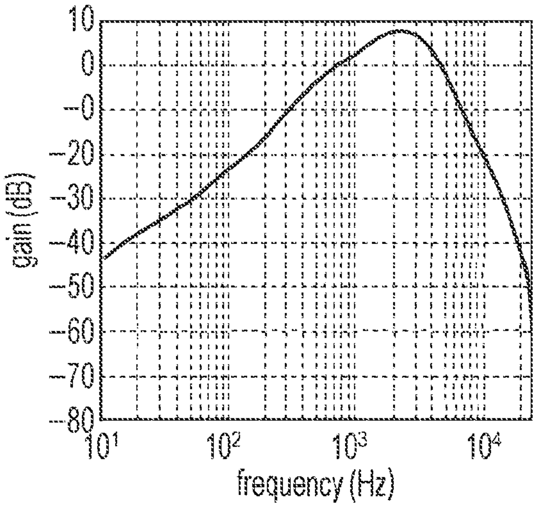

FIGS. 4A and 4B are diagrams for explaining specific frequency characteristics to be set in the equalizer 11.

First, to explain that the low-frequency gain of a sound collection signal transmitted via the ear canal HA becomes larger, FIG. 4A shows the frequency characteristics of a sound collection signal obtained when a predetermined example conversation was collected by a microphone located outside the attachment unit 1 in a noise-free environment (the set of ▲ marks and a dashed line), in contrast with the frequency characteristics of a sound collection signal obtained when the same example conversation was collected by the internal microphone IB in the internal space IV connecting to the ear canal HA in a noise-free environment (the set of ■ marks and a dot-and-dash line).

The frequency characteristics shown in this drawing are temporally averaged on the frequency axis.

In the substantially sealed internal space IV connecting to the ear canal HA, the diaphragm of the internal microphone 1B has greater vibrations than those of the outside as a non-sealed environment when low-frequency acoustic waves and vibrations are caused in the ear canal HA by speaking. As a result, a higher microphone output voltage than that of the microphone located outside is obtained in the lower bands.

As can be seen from FIG. 4A, the sound collection signal generated by the internal microphone 1B ■ & the dot-and-dash line) is actually higher in the lower bands than the sound collection signal generated by the microphone located outside (▲& the dashed line).

With the sound collection signal of the internal microphone 1B having the characteristics shown in FIG. 4A, the speech voice transmitted to the person at the other end of the line is muffled, and becomes unclear and low. As a result, it might become difficult for the person at the other end to hear.

In view of this, the frequency characteristics of the sound collection signal generated by the internal microphone 1B are corrected to achieve a more natural frequency characteristics balance. In this manner, the clarity of the transmitted speech voice to be heard by the person at the other end is increased.

To do so, the frequency characteristics of the sound collection signal generated by the internal microphone 1B need to approximate the frequency characteristics of the sound collection signal generated by the microphone located outside.

Specifically, a filter (or the equalizer 11) expressed by the transfer function shown in FIG. 4B is prepared, and the frequency characteristics of the sound collection signal of the internal microphone 1B are corrected by the filter. That is, the sound collection signal frequency characteristics of the internal microphone 1B are corrected by the equalizer 11 having high-frequency emphasizing (low-frequency suppressing) filter characteristics as shown in FIG. 4B.

After equalizing, more natural voice sound with a higher clarity than the voice sound prior to the equalizing can be obtained.

In FIG. 4A, the set of ● marks and a solid line indicates the frequency characteristics of the sound collection signal of the internal microphone 1B after correction performed by the equalizer 11 having the filter characteristics shown in FIG. 4B.

As can be seen from the frequency characteristics, the sound collection signal generated by the internal microphone 1B approximates the sound collection signal generated by the microphone located outside, and a more natural frequency characteristics balance is maintained.

Figure 3B:
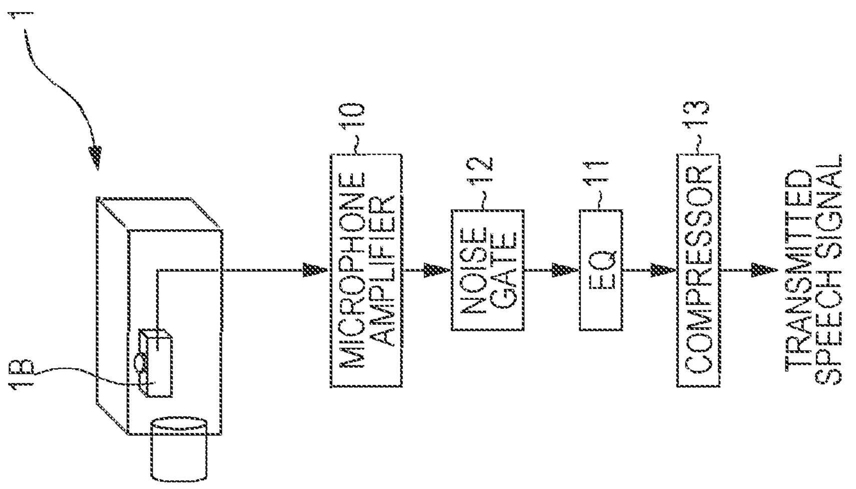

So as to improve the sound quality of transmitted speech voice, it is effective to perform a noise gate process and a compressor process, as well as the correction by the equalizer 11, on the sound collection signal generated by the internal microphone 1B, as shown in FIG. 3B.

Specifically, in the configuration shown in FIG. 3B, after a noise gate processing unit 12 performs a noise gate process on the sound collection signal that has been generated by the internal microphone IB and has passed through the microphone amplifier 10, the equalizer 11 performs the characteristics correction on the sound collection signal. A compressor 13 then performs a compressor process on the sound collection signal transmitted via the equalizer 11.

In the noise gate process, the noise gate processing unit 12 lowers the output signal level (or closes the gate) when the input signal level becomes equal to or lower than a certain level, and returns the output signal level to the original level (or opens the gate) when the input signal level becomes higher than the certain level.

As is normally conducted, parameters, such as the rate of attenuation of the output level, the open/close envelope of the gate, and the frequency bands to which the gate reacts, are appropriately set so that the clarity of speech voice will increase.

In the compressor process, the compressor 13 performs a process to adjust the temporal amplitude of the input sound collection signal.

Figures 5A, 5B:
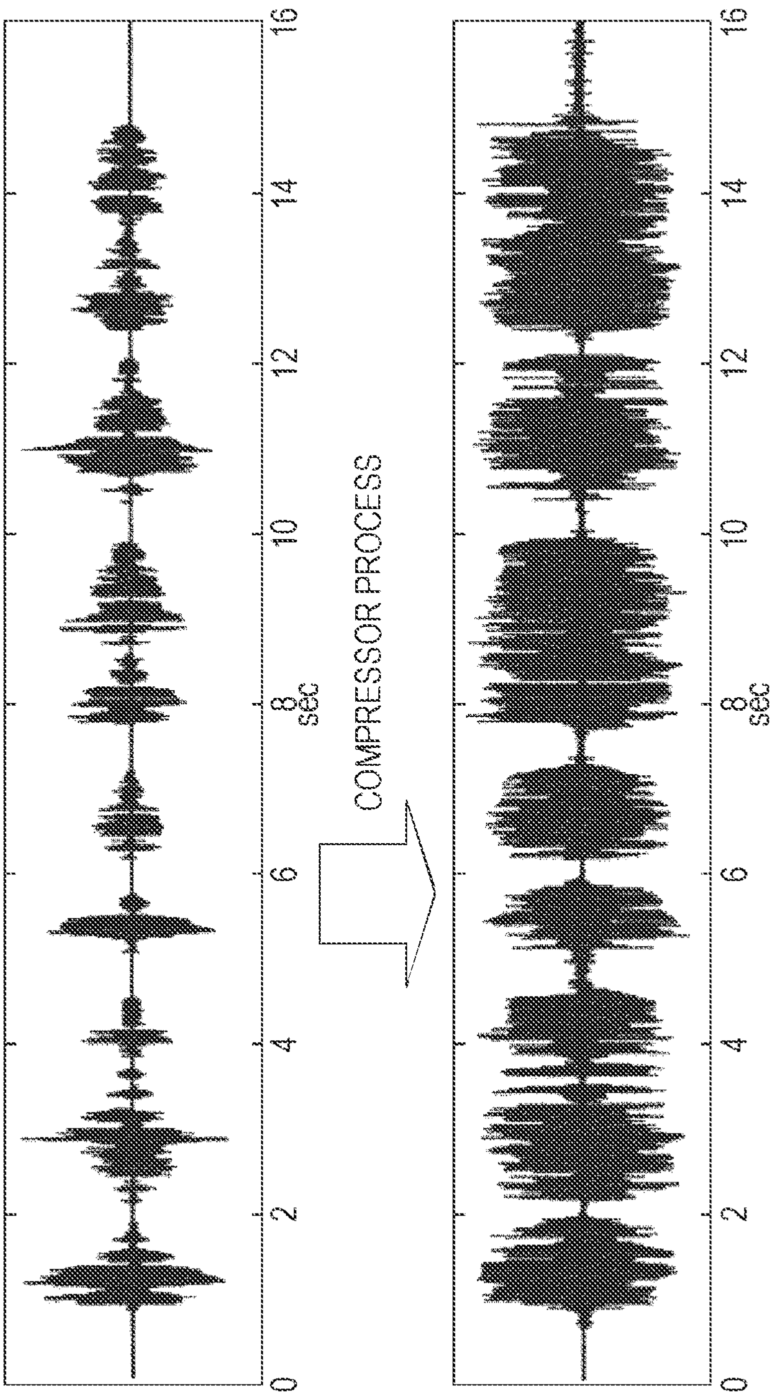
FIGS. 5A and 5B are diagrams for explaining a compressor process.

Referring now to FIGS. 5A and 5B, the compressor process by the compressor 13 is described.

In FIGS. 5A and 5B, FIG. 5A shows the temporal waveform of a sound collection signal prior to the compressor process, and FIG. 5B shows the temporal waveform of the sound collection signal after the compressor process.

While the above described equalizer 11 improves sound quality by adjusting the frequency characteristics of a sound collection signal, the compressor process is performed to correct the waveform of the sound collection signal on the temporal axis.

In this embodiment, speech voice reaches the diaphragm of the internal microphone 1B via the ear canal HA by virtue of vibrations of the body such as flesh and bones of the wearer H, as described above. This means that the speech voice has a certain level of nonlinearity, unlike speech voice that propagates through the external air.

Therefore, the difference in speech voice volume that varies depending on the voice volume at the time of speaking might become larger than that in a case where sound collection is performed through normal propagation in the external air, and, if not corrected, the collected voice might become difficult to hear.

As can be seen from FIG. 5A, the difference in voice volume is larger between each two emitted sound groups.

The compressor 13 then adjusts the temporal amplitude of the sound collection signal generated by the internal microphone 1B as shown in FIG. 5B. That is, the difference in emitted speech voice volume is reduced.

As a result, the emitted speech voice becomes easier to hear, and sound quality is improved.

In this embodiment, the various kinds of signal processing on sound collection signals may be performed by an analog electrical circuit, or may be performed by digital signal processing via an ADC (A/D converter).

3. Further S/N Ratio Improvement by Low-Frequency Extraction

3-1. First Embodiment

As can be understood from the above explanation, sound collection via the ear canal HA as described above with reference to FIG. 2 is performed to achieve a higher S/N ratio from sound collection signals than in a case with the conventional earpiece microphone 100. To further improve the S/N ratio in this embodiment, a filtering process is performed on a sound collection signal generated by an internal microphone 1B, to extract the low-frequency component of the sound collection signal.

When emitted speech voice collection is performed via the ear canal HA as described above with reference to FIG. 2, the emitted speech voice component is dominant over the external noise component in the sound collection signal at lower frequencies.

Figure 6:
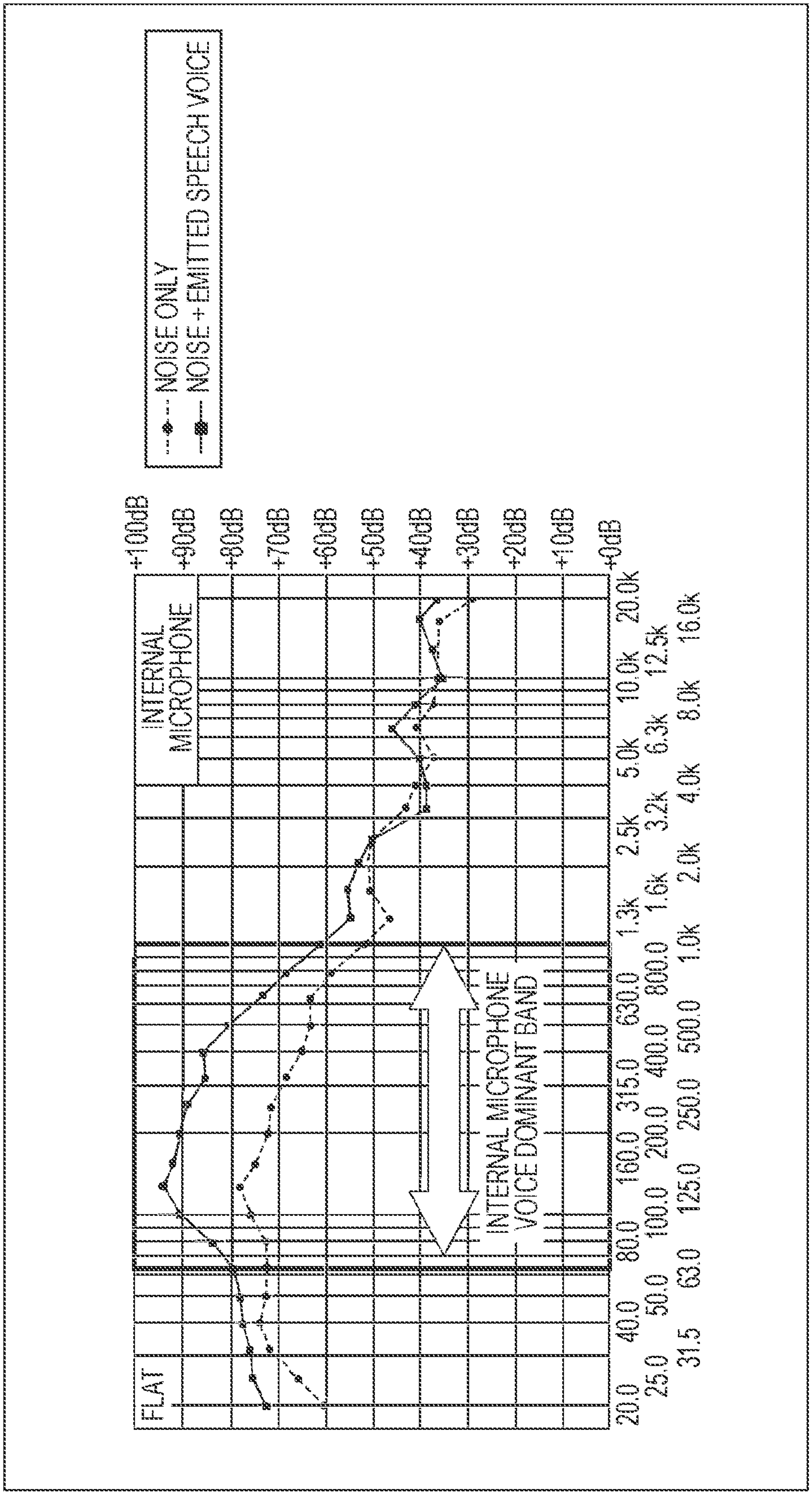
FIG. 6 is a diagram for explaining that the emitted speech voice component is dominant over the extraneous noise component in the low-frequency band of a sound collection signal generated by an internal microphone.

FIG. 6 is a diagram for explaining this aspect, and shows the frequency characteristics of sound collection signals generated by the internal microphone 1B, including the frequency characteristics of a speech voice non-emitted portion in a normal noise environment (the set of ● marks and a dashed line: noise only) and the frequency characteristics of a speech voice emitted portion (the set of ■ marks and a solid line: noise and emitted speech voice).

In the experiment, the cabin noise of a general airplane was used as noise. The analysis was conducted every ⅓ octave.

As can be seen from FIG. 6, in the sound collection signal generated by the internal microphone IB, the level of the signal generated in the case where noise and emitted speech voice were collected (the ■ marks and the solid line) is higher than the level of the signal generated in the case where only noise was collected (the ● marks and the dashed line) particularly at low frequencies. That is, in a case where emitted speech voice collection via the ear canal HA is performed with the internal microphone IB, the emitted speech voice is dominant over the external noise particularly in the low frequency band of the sound collection signal (shown as the internal microphone voice dominant band in the drawing). This is because the low frequency gain of the sound collection component via the ear canal HA becomes larger as shown in FIG. 4A while the noise component is reduced particularly at low frequencies by virtue of the sealing and sound insulating functions derived from the structure of the attachment unit 1.

Accordingly, the S/N ratio of emitted speech voice collection signals can be further improved by performing a filtering process on sound collection signals generated by the internal microphone IB as described above, and extracting the low-frequency components of the sound collection signals (the components in the voice dominant band of the internal microphone IB).

Figure 7:
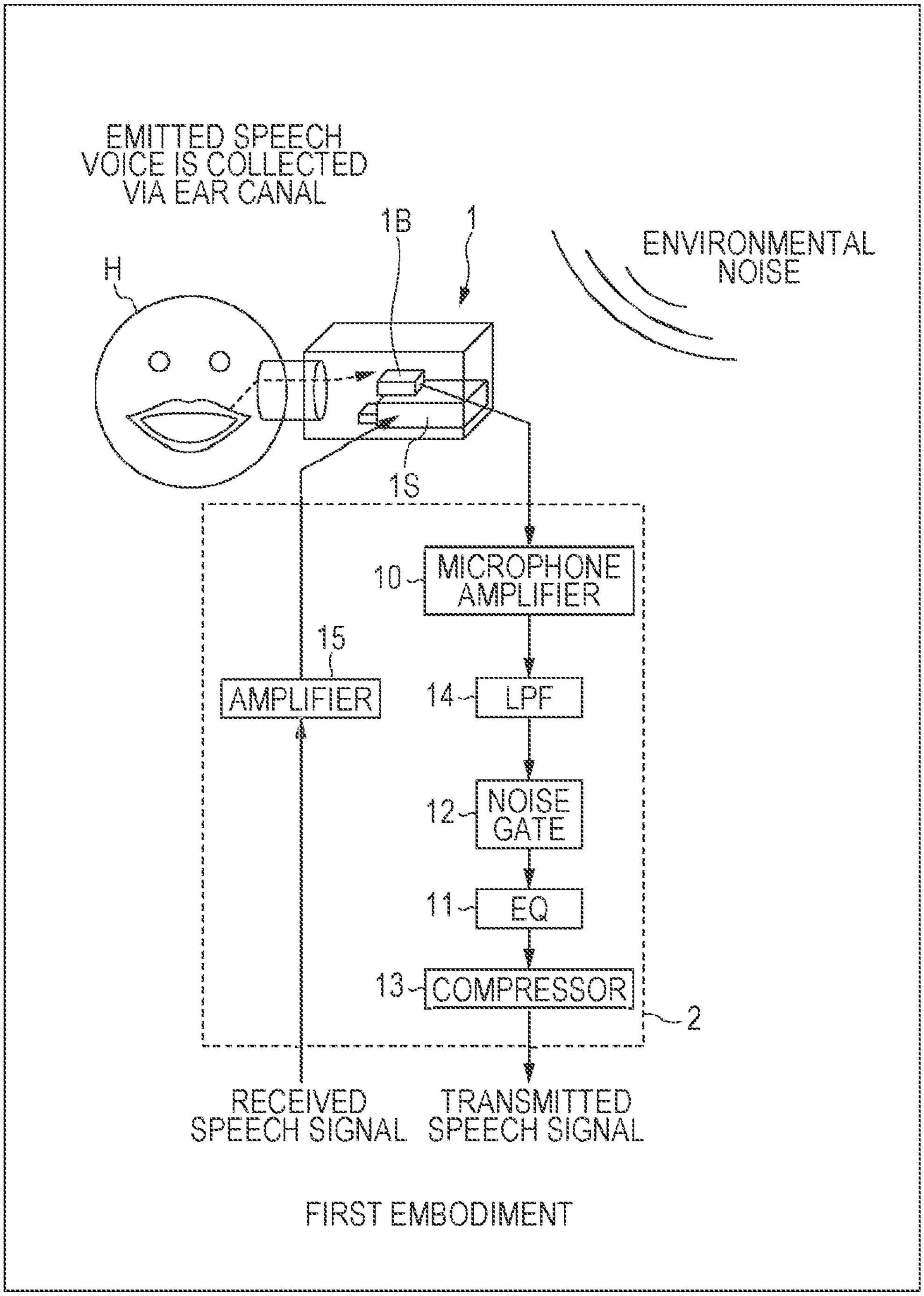
FIG. 7 is a diagram showing the configuration of a sound collection system as a first embodiment.

FIG. 7 is a diagram showing an example configuration of a sound collection system as an embodiment (hereinafter referred to as the first embodiment) to further improve the S/N ratio through the above described low-frequency component filtering process.

In the description below, the same components as those already described are denoted by the same reference numerals as those used for the already described components, and explanation of them will not be repeated.

As shown in FIG. 7, the sound collection system as the first embodiment is designed to include an attachment unit 1 and a signal processing unit 2.

First, a speaker 1S for outputting received speech voice, as well as the internal microphone IB, is provided in the internal space IV of the attachment unit 1 in this case. In this example, the speaker 1S is of a BA (balanced armature) type, with its installation space being taken into account.

The signal processing unit 2 includes not only a microphone amplifier 10, an equalizer 11, a noise gate processing unit 12, and a compressor 13, which have been described above, but also a LPF (low-pass filter) 14 and an amplifier 15.

In this example, the LPF 14 is located between the microphone amplifier 10 and the noise gate processing unit 12, so as to perform a low-pass filtering process on a sound collection signal that has been generated by the internal microphone 1B and passed through the microphone amplifier 10. The cutoff frequency of the LPF 14 is appropriately set so as to extract the components in the "internal microphone voice dominant band" shown in FIGS. 5A and 5B.

In the signal processing unit 2, a sound collection signal that has been generated by the internal microphone 1B and has passed through the compressor 13 is output as a transmitted speech signal to the outside of the signal processing unit 2 as shown in the drawing.

Meanwhile, a received speech signal is supplied to the signal processing unit 2 from the outside.

The amplifier 15 amplifies the received speech signal, and drives the speaker 1S in the attachment unit 1 based on the amplified received speech signal. As a result, received speech voice in accordance with the received speech signal is output from the speaker 1S.

With the above described sound collection system as the first embodiment, the S/N ratio of emitted speech voice collection signals is secured by virtue of the (passive) sound insulating properties of the housing of the attachment unit 1 against environmental noise. The components in the speech voice dominant band are extracted by performing a low-pass filtering process on sound collection signals generated by the internal microphone 1B.

Accordingly, the S/N ratio of emitted speech voice collection signals can be further improved.

With the configuration as the first embodiment shown in FIG. 7, an effect to make hearing of received speech voice easier for the wearer H can be achieved by virtue of the sound insulating properties of the attachment unit 1.

A specific configuration of the sound collection system of this embodiment including the signal processing unit 2 that realizes the above described filtering process for extracting speech voice dominant band components and the various kinds of signal processing (from the equalizer 11 to the compressor 13) for sound quality improvement may be of an "integrated type" having the signal processing unit 2 provided in the attachment unit 1, or of a "separated type" having the signal processing unit 2 provided outside the attachment unit 1.

Figure 8B:
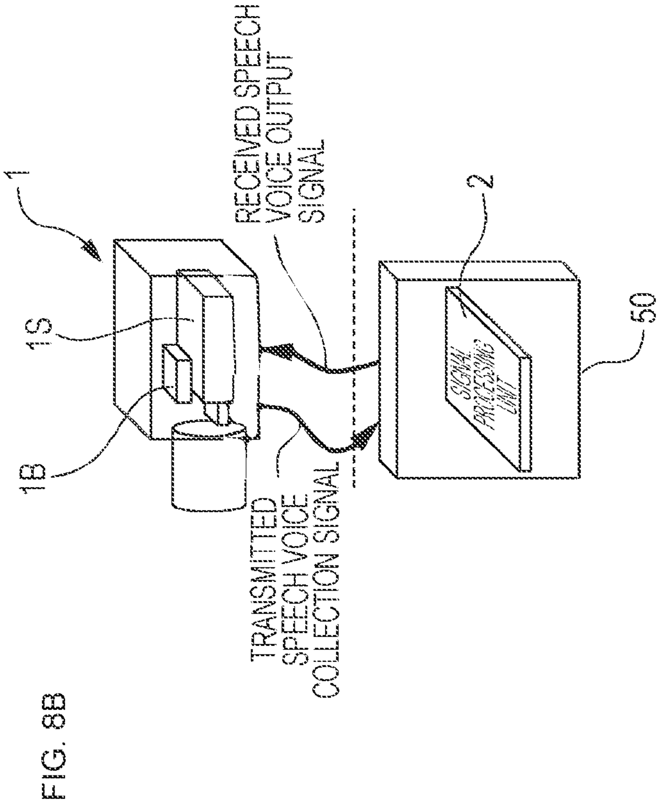
FIGS. 8A and 8B are diagrams showing example configurations of an "integrated type" and a "separated type" in a sound collection system of an embodiment.
Figure 8A:
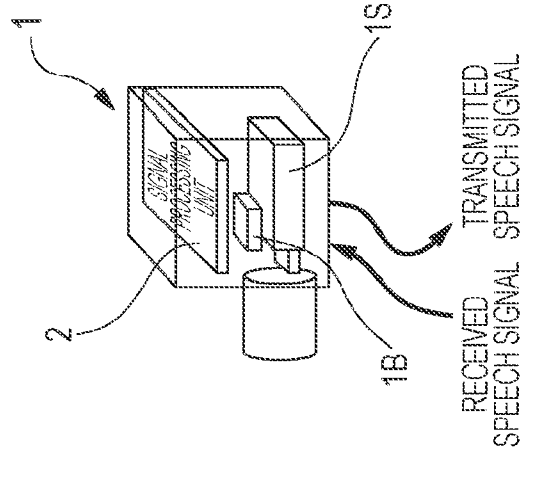

FIGS. 8A and 8B are diagrams showing example configurations of the "integrated type" and the "separated type".

First, the configuration of the "integrated type" shown in FIG. 8A has the signal processing unit 2 provided in the housing of the attachment unit 1. In this case, a transmitted speech signal (or a sound collection signal that has been generated by the internal microphone IB and has been subjected to the various kinds of signal processing by the signal processing unit 2) is transmitted from the attachment unit 1 to an external device 50 (an information processing device such as a smartphone).

Meanwhile, a received speech signal is transmitted from the external device 50 to the attachment unit 1.

In the configuration of the "separated type" shown in FIG. 8B, the signal processing unit 2 is installed in the external device 50. In this case, a sound collection signal generated by the internal microphone 1 (the transmitted speech voice collection signal in the drawing) is transmitted from the attachment unit 1 to the external device 50. Meanwhile, a received speech signal (the received speech voice output signal in the drawing) amplified by the amplifier 15 in the signal processing unit 2 is transmitted from the external device 50 to the attachment unit 1 (the speaker 1S).

3-2. Second Embodiment

Figure 9:
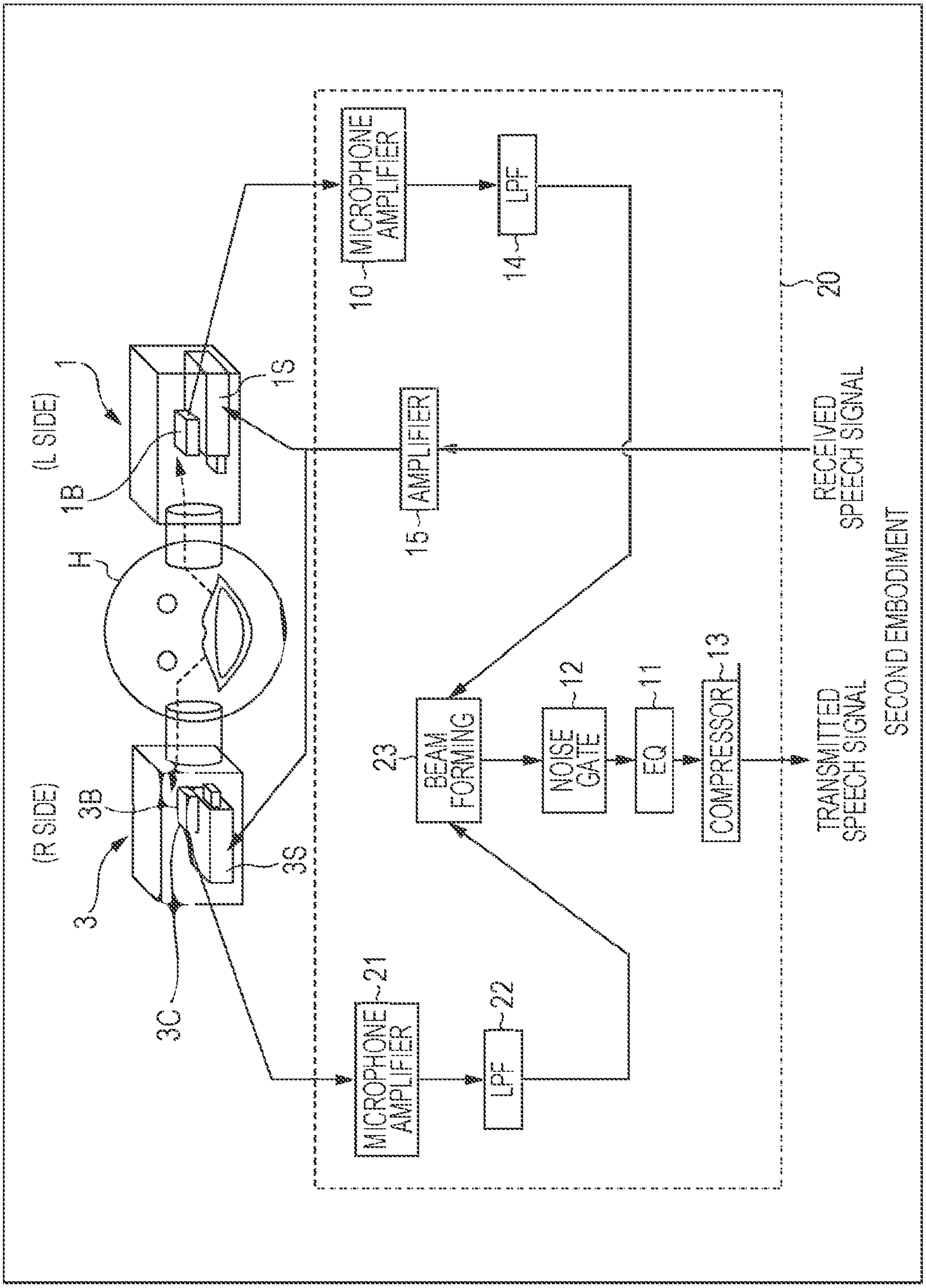
FIG. 9 is a diagram showing the configuration of a sound collection system as a second embodiment.

FIG. 9 is a diagram for explaining the configuration of a sound collection system as a second embodiment.

In the second embodiment, the S/N ratio of emitted speech voice collection signals is to be further improved by a beam forming process using signals generated by collecting sound at both the right and left channels, and received speech voice is to be heard by both ears of the wearer H. In the description below, a channel will be also referred to as "ch".

This embodiment is based on the premise that a received speech signal is normally monaural. Therefore, in the second embodiment, a system for both ears to hear the monaural received voice is suggested.

The sound collection system of the second embodiment differs from the sound collection system of the first embodiment shown in FIG. 7 in that an attachment unit 3 is added, and a signal processing unit 20 is provided in place of the signal processing unit 2.

Between the ears of the wearer H, the attachment unit 3 is to be attached to the ear on the opposite side from the ear to which the attachment unit 1 is attached. Like the attachment unit 1, the attachment unit 3 is designed so that at least part of the attachment unit 3 can be inserted into an earhole portion HB of the wearer H, and accordingly, the attachment unit 3 can be attached to an ear of the wearer H. Specifically, the attachment unit 3 also includes an earhole insertion portion 3A having such a shape that can be inserted into the earhole portion HB of the wearer H, and the earhole insertion portion 3A is inserted into the earhole portion HB, so that the attachment unit 3 is attached to the ear of the wearer H.

The attachment unit 3 is also designed so that an internal space 3V connecting to the ear canal HA of the wearer H is formed when the attachment unit 3 is attached to the wearer H. The earhole insertion portion 3A is covered with a material having elasticity in its surface portion so that contact with the earhole portion HB is achieved at the time of attachment.

An internal microphone 3B is provided in the internal space 3V of the attachment unit 3 as shown in the drawing. In this example, the internal microphone 3B is also a MEMS microphone.

A speaker 3S is also provided in the internal space 3V of the attachment unit 3. In this example, the speaker S3 is also of the BA (balanced armature) type.

The speaker 3S is driven based on a received speech signal amplified by an amplifier 15 provided in the signal processing unit 20. In this case, the output of the amplifier 15 is also supplied to the speaker 1S on the side of the attachment unit 1 as in the first embodiment, and, as a result, the received speech voice based on the received speech signal is output from both the side of the attachment unit 1 and the side of the attachment unit 3.

In the second embodiment, the side of the attachment unit 1 is the Lch side, and the side of the attachment unit 2 is the Rch side.

The signal processing unit 20 differs from the signal processing unit 2 of the first embodiment in that a microphone amplifier 21 and a LPF 22 for the Rch side, and a beam forming unit 23 are added.

The microphone amplifier 21 amplifies a sound collection signal generated by the internal microphone 3B on the side of the attachment unit 3.

Using the same cutoff frequency as that of the SPF 14, the LPF 22 performs a low-pass filtering process to extract the low-pass component as the above described speech voice dominant band from the sound collection signal generated by the internal microphone 3B. In this case, the LPF 22 performs a low-pass filtering process on the sound collection signal that has been generated by the internal microphone 3B and has been amplified by the microphone amplifier 21.

In this manner, the LPF 22 also improves the S/N ratio of sound collection signals generated by the internal microphone 3B.

The beam forming unit 23 receives a sound collection signal (a Lch-side sound collection signal) that has been generated by the internal microphone IB and has passed through the LPF 14 located on the Lch side, and a sound collection signal (a Rch-side sound collection signal) that has been generated by the internal microphone 3B and has passed through the LPF 22 located on the Rch side. The beam forming unit 23 then performs a beam forming process.

The simplest specific example of the beam forming process using the Lch and Rch sound collection signals may be a process in which the Lch side sound collection signal is added to the Rch side sound collection signal.

In the configuration shown in FIG. 9, the internal microphone IB that performs emitted speech voice collection on the Lch side and the internal microphone 3B that performs emitted speech voice collection on the Rch side are located at the same distance from the mouth (the vocal cords) of the wearer Has the source of the emitted speech voice. Accordingly, the sound coming from the direction of the source of the emitted speech voice (via the ear canal HA) can be efficiently extracted by adding the sound collection signals at the beam forming unit 23, and the sound coming from the other directions (noise components) can be suppressed. That is, the S/N ratio of emitted speech voice collection signals can be further improved.

Specific example techniques that can be used in the beam forming process include not only the above described adding operation but also a technique of determining voice components coming from the direction of the sound source based on a result of sound analysis conducted on sound collection signals, and extracting only the voice components from the direction of the sound source based on the determination result. At this point, a process of determining dominant components in the sound collection signals may be performed as a specific process in the sound analysis.

To sum up the beam forming process in this case, voice components coming from the direction of the sound source should be emphasized, and voice components coming from the other directions should be suppressed.

A sound collection signal subjected to the beam forming process by the beam forming unit 23 is output as an emitted speech signal to the outside of the signal processing unit 20 via the noise gate processing unit 12, the equalizer 11, and the compressor 13.

With the above described sound collection system as the second embodiment, an improvement effect of the (passive) sound insulating properties of the housings of the attachment units 1 and 3, and an improvement effect of extraction of the emitted speech voice dominant area components by the LPFs 14 and 22 are achieved as an effect to improve the S/N ratio of emitted speech voice collection signals. Furthermore, a S/N ratio improvement effect can be achieved by a noise component reduction performed by the beam forming unit 23.

Also, with the configuration as the second embodiment shown in FIG. 9, a sound insulating effect is also achieved by the attachment unit 3. Accordingly, sound insulating effects can be achieved at both ears of the wearer H. As a result, hearing of received speech voice can be made easier than in the first embodiment.

In the second embodiment, the signal processing for further improving the S/N ratio of emitted speech voice collection signals may be a noise reduction process according to a SS (Spectrum Subtraction) method, for example, as well as the aforementioned beam forming process.

The noise reduction process according to the SS method is disclosed in Reference Document 1 mentioned below, for example.

Reference Document 1: Japanese Patent Application Laid-Open No. 2010-11117

It should be noted that either of the configurations of the "integrated type" and the "separated type" shown in FIGS. 8A and 8B may also be adopted in the second embodiment.

In a case where the configuration of the "integrated type" is adopted in a configuration including both the attachment unit 1 and the attachment unit 3 as in the second embodiment, the signal processing unit 20 can be provided in one of the attachment units 1 and 3. In that case, a sound collection signal generated by the internal microphone in the other attachment unit is input to the attachment unit in which the signal processing unit 20 is provided, and a received speech signal amplified by the amplifier 15 is input from the attachment unit to the other attachment unit.

Alternatively, in a structure that performs a beam forming process to obtain a monaural speech signal to be transmitted as in the second embodiment, only the components (23, 12, 11, and 13) that come after the beam forming unit 23 may be provided in one of the attachment units 1 and 3 (in other words, only the microphone amplifier 21 and the LPF 22 among the components constituting the signal processing unit are provided in the attachment unit 3).

The same also applies to the respective embodiments described below.

3-3. Third Embodiment

Figure 10:
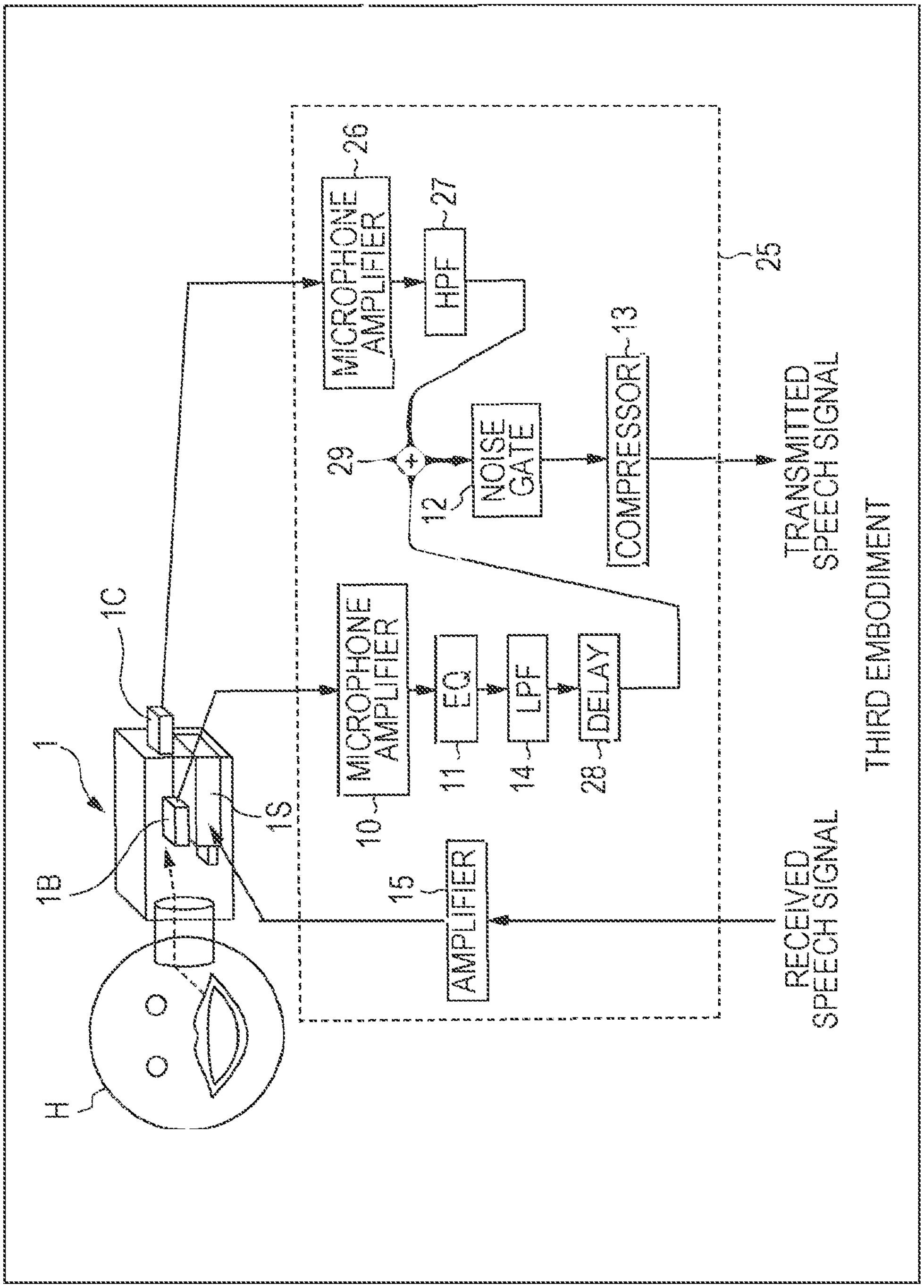
FIG. 10 is a diagram showing the configuration of a sound collection system as a third embodiment.

FIG. 10 is a diagram showing the configuration of a sound collection system as a third embodiment.

The sound collection system of the third embodiment differs from the sound collection system of the first embodiment in that an external microphone 1C is added to the attachment unit 1, and a signal processing unit 25 is provided in place of the signal processing unit 2.

First, the external microphone 1C is a microphone that is installed to collect sound generated outside the housing of the attachment unit 1. In this example, the external microphone 1C is installed so that the sound collection port thereof is located on the surface of the housing of the attachment unit 1.

In this example, the external microphone 1C is also a MEMS microphone, like the internal microphone IB.

The external microphone 1C is installed so as to collect sound that is generated outside the housing of the attachment unit 1, and the sound collection port thereof is not necessarily in direct contact with the outside of the housing of the attachment unit 1.

The signal processing unit 25 differs from the signal processing unit 2 in further including a microphone amplifier 26, a HPF (high-pass filter) 27, a delay circuit ("DELAY" in the drawing) 28, and an adder 29.

The microphone amplifier 26 amplifies a sound collection signal generated by the external microphone 1C.

The HPF 27 performs a high-pass filtering process on a sound collection signal that has been generated by the external microphone 1C and has been amplified by the microphone amplifier 26.

The delay circuit 28 is provided in the signal processing system (between the microphone amplifier 10 and the adder 29) for sound collection signals generated by the internal microphone 1B, and delays each sound collection signal generated by the internal microphone 1B by a predetermined amount of time.

In this example, the delay circuit 28 is provided between the LPF 14 and the adder 29, and delays a sound collection signal that has been generated by the internal microphone 1B and has passed through the LPF 14 by the predetermined amount of time.

The adder 29 is provided so as to add a sound collection signal that has been generated by the internal microphone 1B and has been subjected to a low-pass filtering process by the LPF 14, to a sound collection signal that has been generated by the external microphone 1C and has been subjected to a high-pass filtering process by the HPF 27. Specifically, the adder 29 in this case is provided in the position where an output signal from the delay circuit 28 is added to an output signal from the HPF 27.

The combined signal generated by the adder 29 passes through the noise gate processing unit 12 and the compressor 13, and is then output as an emitted speech signal to the outside of the signal processing unit 25.

In this case, the equalizer or the equalizing filter for suppressing an increase in the low-frequency band (muffled sound) due to sound collection performed by the internal microphone 1B through the ear canal HA should function only for the side of sound collection signals generated by the internal microphone 1B, and is located in an earlier stage than the adder 29 (or in an earlier stage than the combination with an output of the HPF 27).

Specifically, the equalizer 11 in this example is located between the microphone amplifier 10 and the LPF 14, and is designed to perform an equalizing process on a sound collection signal that has been generated by the internal microphone 1B and has been amplified by the microphone amplifier 10.

As can be understood from the above description, in the third embodiment, the external microphone 1C is provided for the attachment unit 1, and a signal generated by performing a high-pass filtering process of the HPF 27 on a sound collection signal generated by the external microphone 1C is added, by the adder 29, to a sound collection signal that has been generated by the internal microphone IB and has passed through the LPF 14.

The external microphone 1C collects speech voice emitted from the mouth of the wearer H through the outside (the external air). At the same time, the external microphone 1C collects environmental noise.

The HPF 27 performs a high-pass filtering process on a sound collection signal generated by the external microphone 1C, because the emitted speech voice component in the sound collection signal generated by the external microphone 1C is dominant over the noise component at mid and high frequencies (in the mid- and high-frequency bands), which is the opposite of the case with a sound collection signal generated by the internal microphone IB.

Figure 11A:
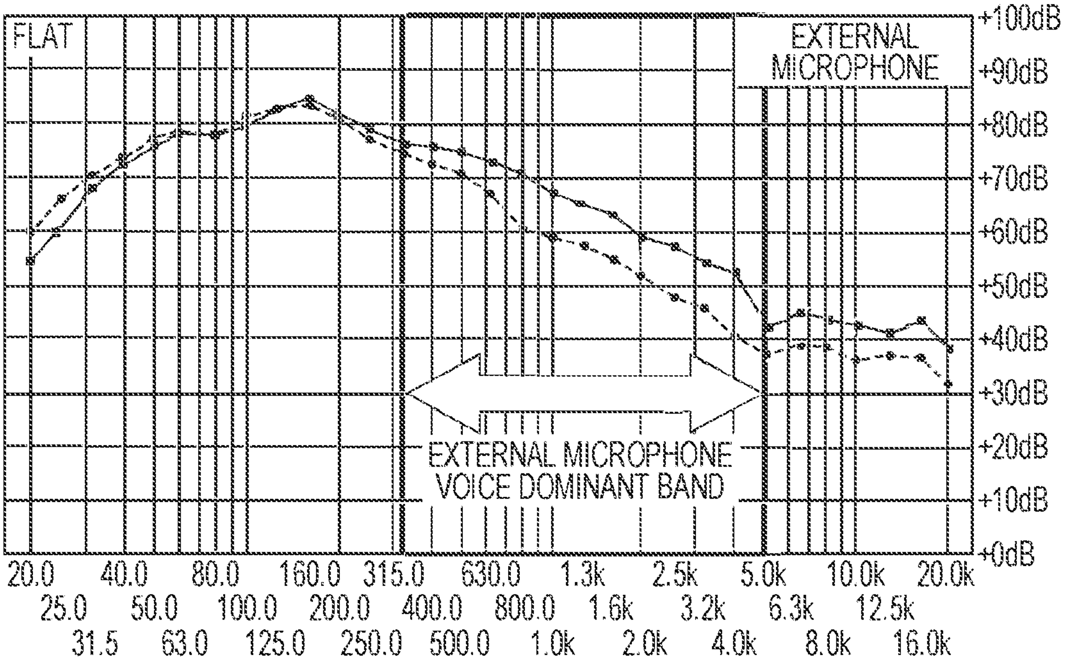
FIGS. 11A and 11B are diagrams for explaining that the emitted speech voice component is dominant over the extraneous noise component in the mid- and high-frequency band of a sound collection signal generated by an external microphone.
Figure 11B:
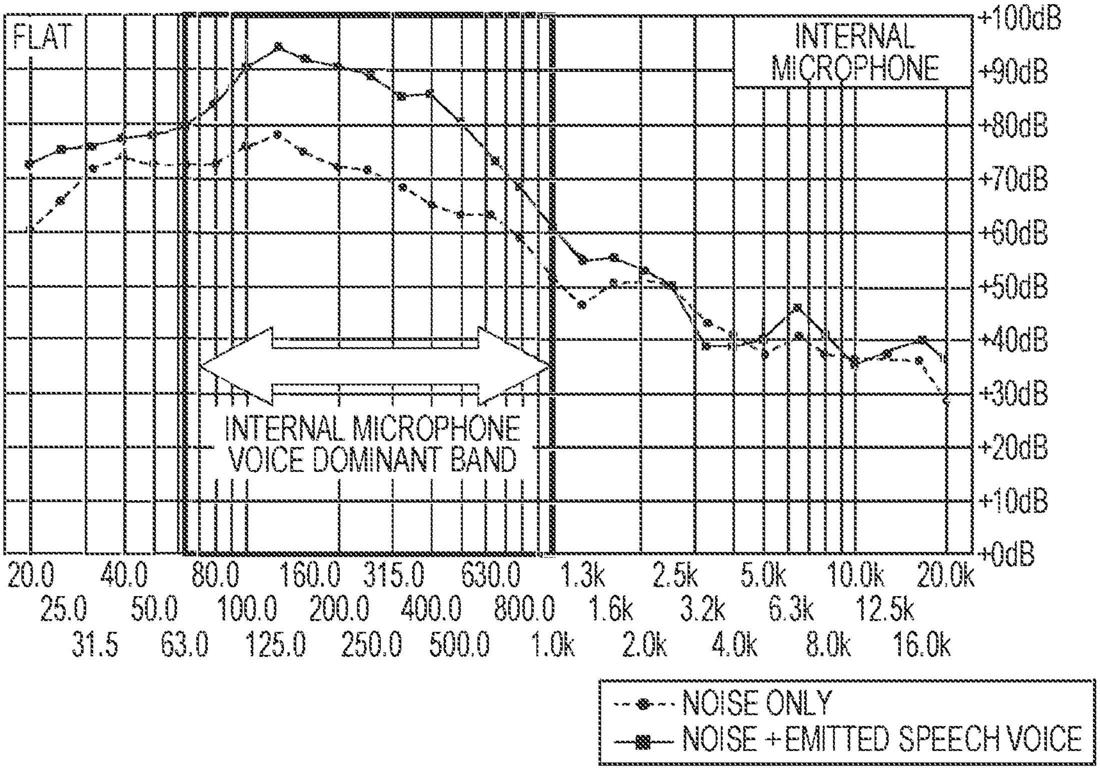

FIGS. 11A and 11B are diagrams for explaining this aspect. FIG. 11A shows the frequency characteristics of sound collection signals generated by the external microphone 1C, including the frequency characteristics of a speech voice non-emitted portion in a normal noise environment (the set of ● marks and a dashed line: noise only) and the frequency characteristics of a speech voice emitted portion (the set of ■ marks and a solid line: noise and emitted speech voice).

For comparison, FIG. 11B shows the frequency characteristics of sound collection signals generated by the internal microphone IB, including the frequency characteristics of a speech voice non-emitted portion in a normal noise environment (the set of ● marks and a dashed line: noise only) and the frequency characteristics of a speech voice emitted portion (the set of ■ marks and a solid line: noise and emitted speech voice), which are the same as those shown in FIG. 6.

In this case, the cabin noise of a general airplane was also used as noise, and the analysis was conducted every ⅓ octave. The result shown in FIG. 11A is the result of a case where the same voice sequence as that in the case of FIG. 11B (FIG. 6) was emitted.

As can be seen from FIG. 11A, with the external microphone 1C, the level of the signal generated in the case where only noise was collected (the ● marks and the dashed line) is substantially the same as the level of the signal generated in the case where noise and emitted speech voice were collected (the ■ marks and the solid line) at low frequencies. At mid and high frequencies, however, the level of the signal generated in the case where noise and emitted speech voice were collected is higher than the level of the signal generated in the case where only noise was collected.

This result shows that, in a case where emitted speech voice is collected via the outside by the external microphone 1C, the emitted speech voice is dominant particularly in the mid- and high-frequency bands of the sound collection signal (the external microphone voice dominant band in the drawing).

As can be seen from the result in FIG. 11A, the low-frequency component of actual noise such as noise in the cabin of an airplane (the ● marks and the dashed line) is normally very large, and the level of the noise tends to become lower at high frequencies. Therefore, in sound collection by the external microphone 1C, emitted speech voice components tend to be dominant over noise components at mid and high frequencies.

As can be understood from the above, the mid- and high-frequency components in speech voice emitted by the wearer H can be extracted at a relatively high S/N ratio by performing a high-pass filtering process on a sound collection signal of the external microphone 1C in the above described configuration as the third embodiment.

As described above, in the third embodiment, the adder 29 adds a sound collection signal that has passed through the HPF 27, to a sound collection signal that has passed through the LPF 14. That is, the band in which emitted speech voice is dominant is selected for each of the output signals from the external and internal sound collection microphones, and the components in the selected bands are combined.

With the above described configuration as the third embodiment, usable information not only in the low frequency band but also in the mid- and high-frequency bands of emitted speech voice can be added as an emitted speech voice collection signal, and as a result, the person at the other end of the line can hear emitted speech voice with higher sound quality.

It should be noted the cutoff frequency of the HPF 27 is appropriately set so that the components in the mid- and high-frequency voice dominant bands shown in FIG. 11A can be extracted.

In the second embodiment, the delay circuit 28 is provided to delay a sound collection signal generated by the internal microphone IB with respect to a sound collection signal generated by the external microphone 1C.

This delay is intended to eliminate the difference in emitted speech voice arrival time due to the difference in installation position between the internal microphone IB and the external microphone 1C.

Specifically, a delay time equivalent to the time difference between the arrival time of emitted speech voice of the wearer H to the internal microphone IB and the arrival time of the emitted speech voice to the external microphone 1C is set in the delay circuit 28. Accordingly, it is possible to suppress sound quality degradation that might occur in a case where the distance between the internal microphone IB and the external microphone 1C is relatively long, and the above mentioned difference in arrival time is relatively large.

For example, in a case where the distance between the two microphones is 1 cm, a delay time of approximately 30 μsec should be set, with the speed of sound being approximately 340 m/sec.

3-4. Fourth Embodiment

Figure 12:
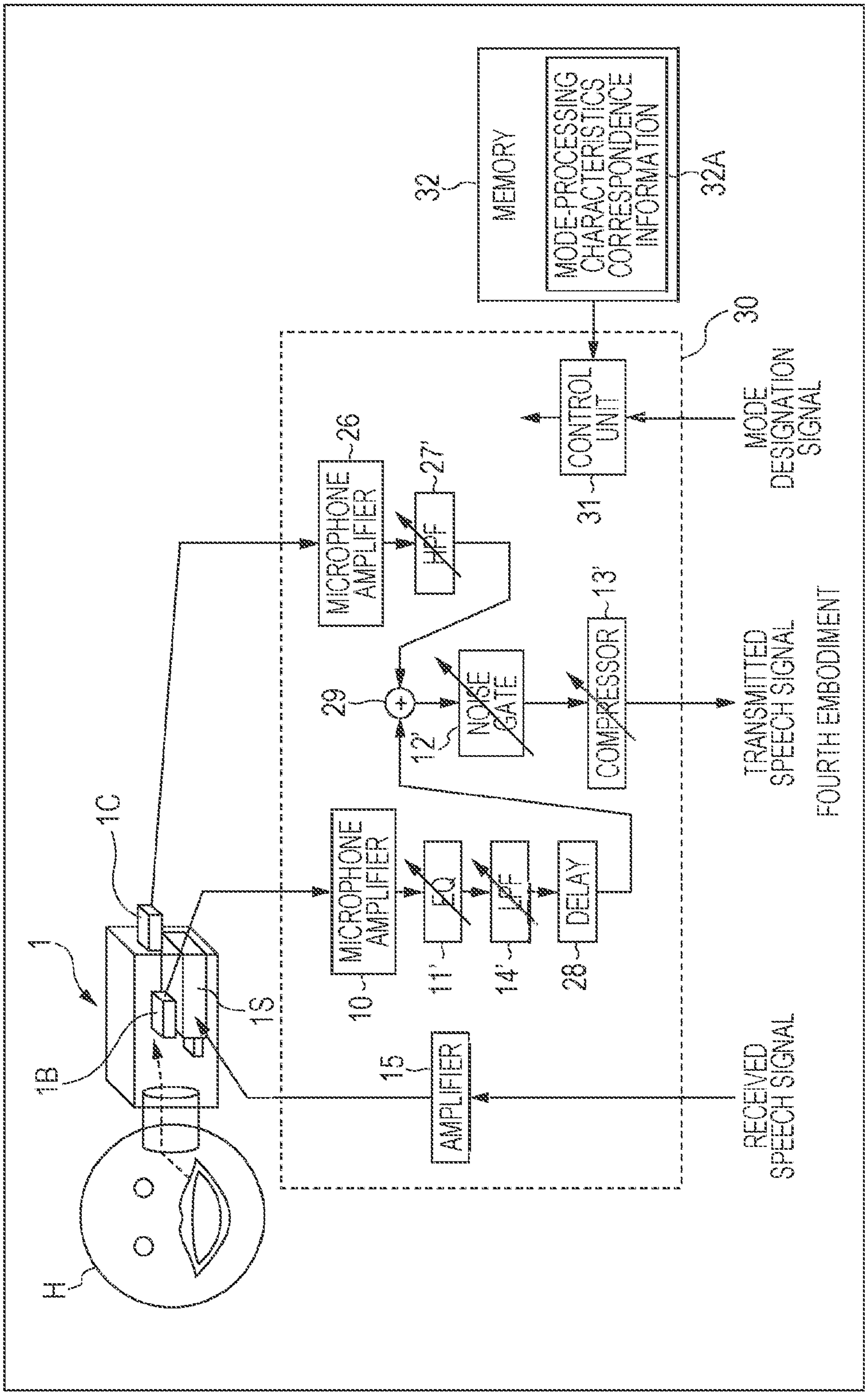
FIG. 12 is a diagram showing the configuration of a sound collection system as a fourth embodiment.

FIG. 12 is a diagram showing the configuration of a sound collection system as a fourth embodiment.

In the fourth embodiment and the later described fifth embodiment, the processing properties of each signal processing unit to improve the S/N ratio and sound quality are made variable, and switching of the processing characteristics is enabled where necessary, so as to realize an appropriate improvement process that reflects an extraneous noise state and an intention of a user (the wearer H), for example.

The fourth embodiment to be described below with reference to FIG. 12 is to switch processing characteristics of the respective components in accordance with a user operation.

The sound collection system in this case differs from the above described sound collection system of the third embodiment (FIG. 10) in that a signal processing unit 30 is provided in place of the signal processing unit 25. Also, a memory 32 is newly added.

The signal processing unit 30 differs from the signal processing unit 25 in that the processing characteristics of the equalizer 11, the LPF 14, the HPF 27, the noise gate processing unit 12, and the compressor 13 are made variable.

Hereinafter, the above components having variable processing characteristics will be referred to as an equalizer 11', a LPF 14', a HPF 27', a noise gate processing unit 12', and a compressor 13', as shown in the drawing.

A control unit 31 is further provided in the signal processing unit 30.

The control unit 31 controls switching of the processing characteristics of the equalizer 11', the LPF 14', the HPF 27', the noise gate processing unit 12', and the compressor 13'.

Specifically, a mode designation signal is input from outside to the control unit 31 in this case. This mode designation signal serves as a signal indicating the type of a processing mode that is selected in accordance with a user operation.

The memory 32 is a storage device that can be read by the control unit 31. The memory 32 stores mode-processing characteristics correspondence information 32A in which the information about the respective modes to be designated by the mode designation signal is associated with the information about the processing characteristics (hereinafter referred to as the processing characteristics information) to be set in the respective components (the equalizer 11', the LPF 14', the HPF 27', the noise gate processing unit 12', and the compressor 13') that have the processing characteristics varying with the modes.

For example, the parameter information required for changing the processing characteristics of the respective components is stored as the processing characteristics information.

The control unit 31 reads the processing characteristics information in accordance with the characteristics indicated by the mode designation signal, and changes the processing characteristics of the respective components having the processing characteristics that can vary with the processing characteristics information. With this configuration as the fourth embodiment, the S/N ratio and sound quality can be improved in an appropriate processing mode that reflects an intension of the user in accordance with the extraneous noise state or the like.

In the above description, the processing characteristics of all the components that perform the process to improve the S/N ratio and sound quality are made variable and are switched. However, the processing characteristics of at least one of those components should be made variable and be switched. The same applies to the fifth embodiment described below.

3-5. Fifth Embodiment

Figure 13:
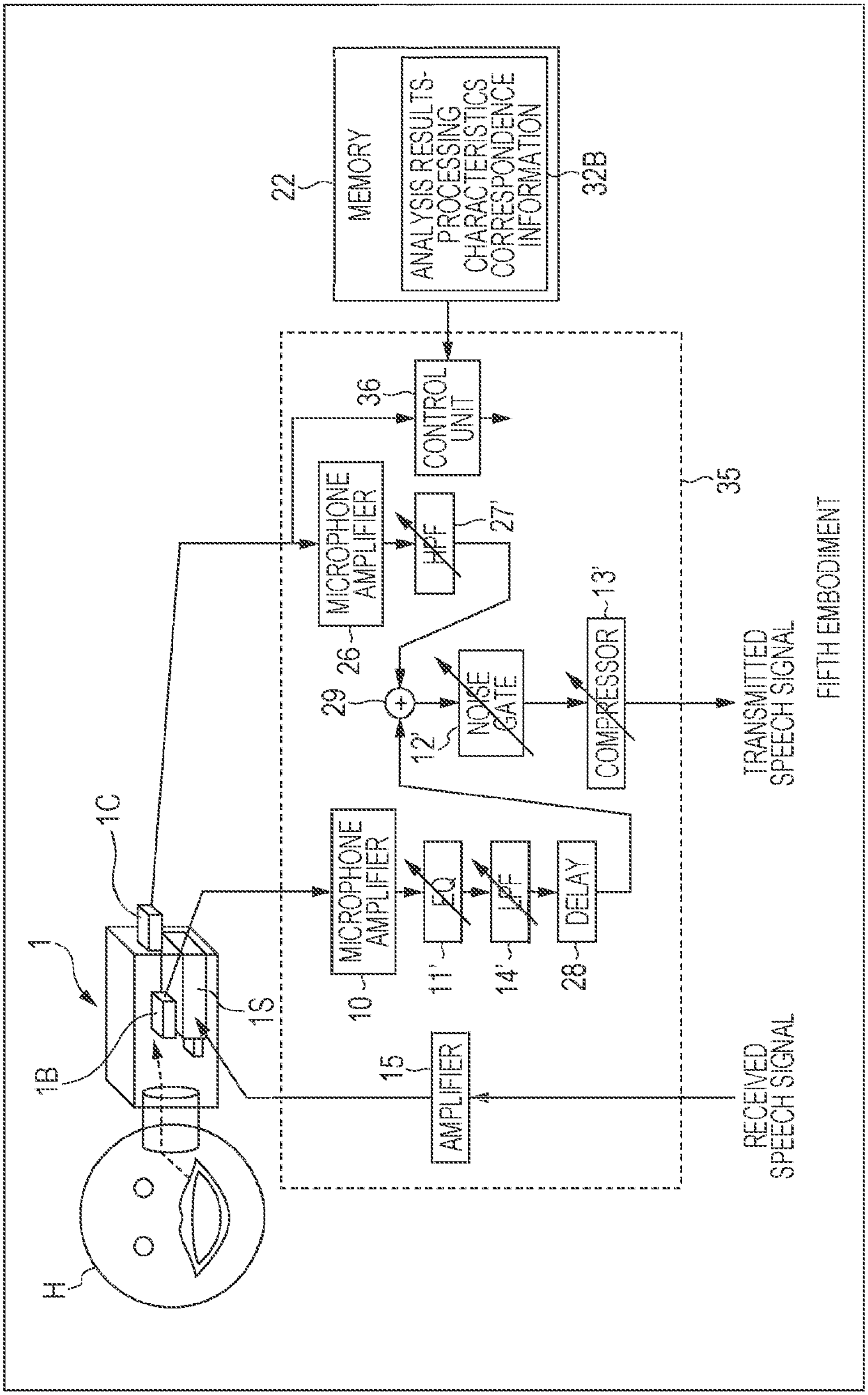
FIG. 13 is a diagram showing the configuration of a sound collection system as a fifth embodiment.

FIG. 13 is a diagram showing the configuration of a sound collection system as the fifth embodiment.

In the fifth embodiment, processing characteristics are automatically switched based on a result of a sound analysis on the extraneous noise state, regardless of user operations.

The sound collection system of the fifth embodiment differs from the sound collection system of the fourth embodiment in that a signal processing unit 35 is provided in place of the signal processing unit 30, and the memory 32 stores analysis results-processing characteristics correspondence information 32B, instead of the mode-processing characteristics correspondence information 32A.

The signal processing unit 35 differs from the signal processing unit 30 of the fourth embodiment in that a control unit 36 is provided in place of the control unit 31.

The control unit 36 performs a sound analysis process on extraneous noise based on a sound collection signal generated by the external microphone 1C, and switches the processing characteristics of the equalizer 11', the LPF 14', the HPF 27', the noise gate the compressor 13' based on a result of the analysis and the information contents of the analysis results-processing characteristics correspondence information 32B.

As shown in the drawing, in this example, a sound collection signal that has been generated by the external microphone 1C and has not yet been input to the microphone amplifier 26 is input to the control unit 36.

In the analysis results-processing characteristics correspondence information 32B stored in the memory 32 in this case, the information indicating the results that can be obtained as the results (equivalent to the types of noise states) of the analysis conducted by the control unit 36 is associated with the processing characteristics information indicating the processing characteristics to be set in the respective components having the processing characteristics that can vary with the results of the analysis.

Based on a result of the analysis on extraneous noise, the control unit 36 reads the corresponding processing characteristics information from the analysis results processing characteristics correspondence information 32B, and changes the processing characteristics of the respective components having the variable processing characteristics in accordance with the read processing characteristics information.

Figure 14:
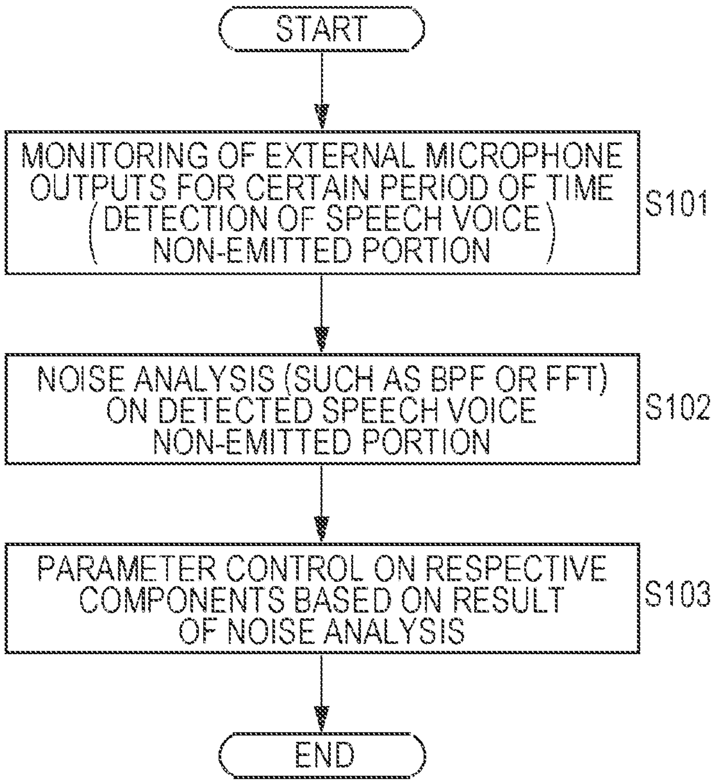
FIG. 14 is a flowchart showing specific procedures in a process to be performed by a control unit in the fifth embodiment.

FIG. 14 is a flowchart showing the specific procedures in a process to be performed by the control unit 36.

First, in step S101 in FIG. 14, external microphone outputs are monitored for a certain period of time.

Specifically, by this monitoring process, a speech voice non-emitted portion (a speech voice non-emitted period) is detected from a sound collection signal generated by the external microphone 1C.

Based on the fact that general environmental noise is (quasi-)steadier than emitted speech voice, for example, a speech voice non-emitted portion is detected by monitoring microphone outputs for a certain period of time and extracting a low-level period among them as the speech voice non-emitted portion.

In step S102, a noise analysis is conducted on the detected speech voice non-emitted portion. Specifically, a frequency analysis is conducted on the portion of the sound collection signal detected as the speech voice non-emitted portion by the processing in step S101.

The frequency analysis in step S102 can be realized by using a BPF (bandpass filter), FFT (fast Fourier transform), or the like.

After the noise analysis is conducted in step S102, parameter control is performed in step S103 on the respective components based on a result of the noise analysis. Specifically, the processing characteristics of the respective components having variable processing characteristics as described above are switched based on the result of the noise analysis conducted in step S102 and the information contents of the analysis results-processing characteristics correspondence information 32B in the memory 32.

With the above described sound collection system as the fifth embodiment, emitted speech voice can be collected appropriately at a high S/N ratio and with high sound quality, even if the type of noise changes in the surroundings of the user.

3-6. Sixth Embodiment

Figure 15:
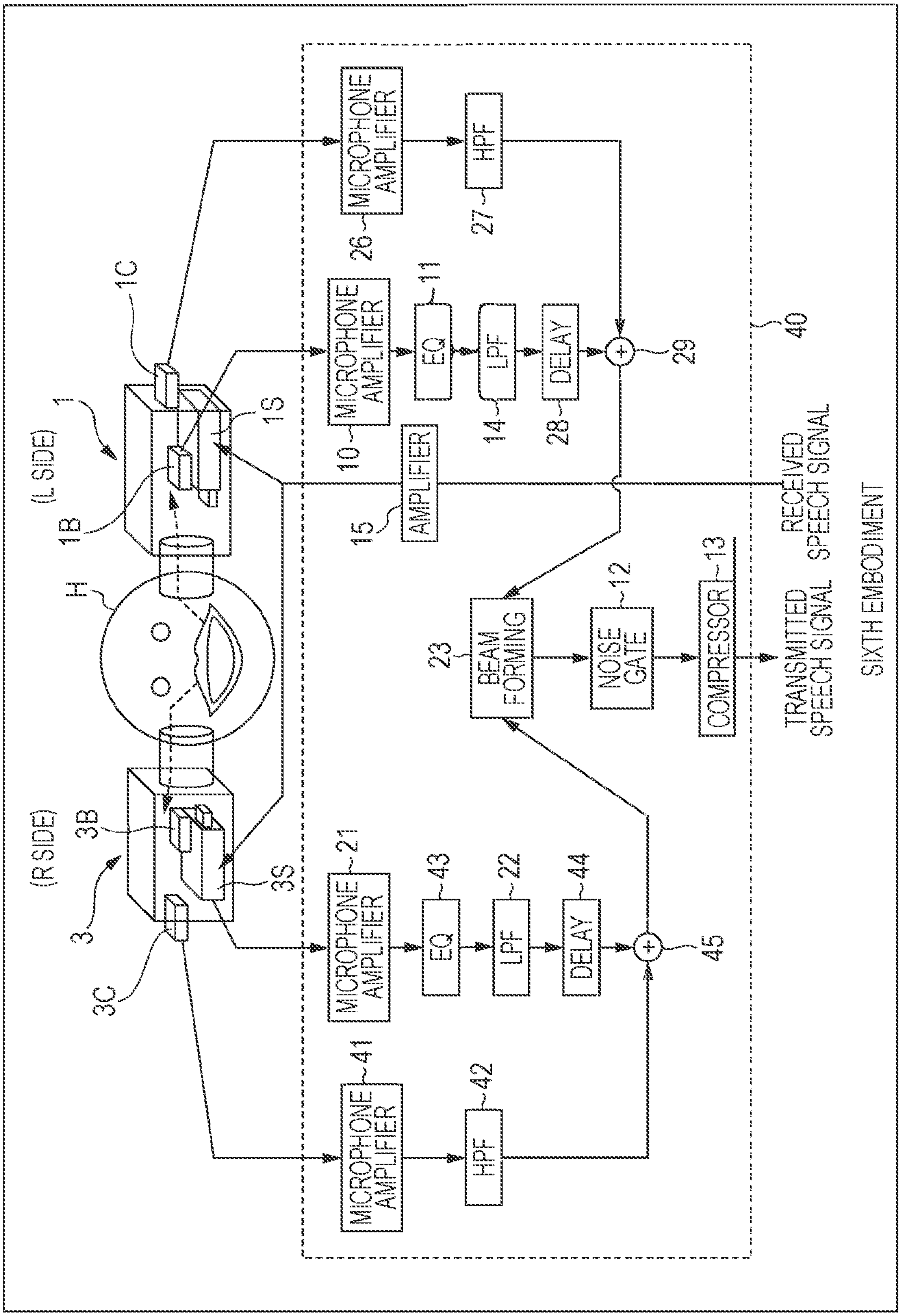
FIG. 15 is a diagram showing the configuration of a sound collection system as a sixth embodiment.
Figure 16:
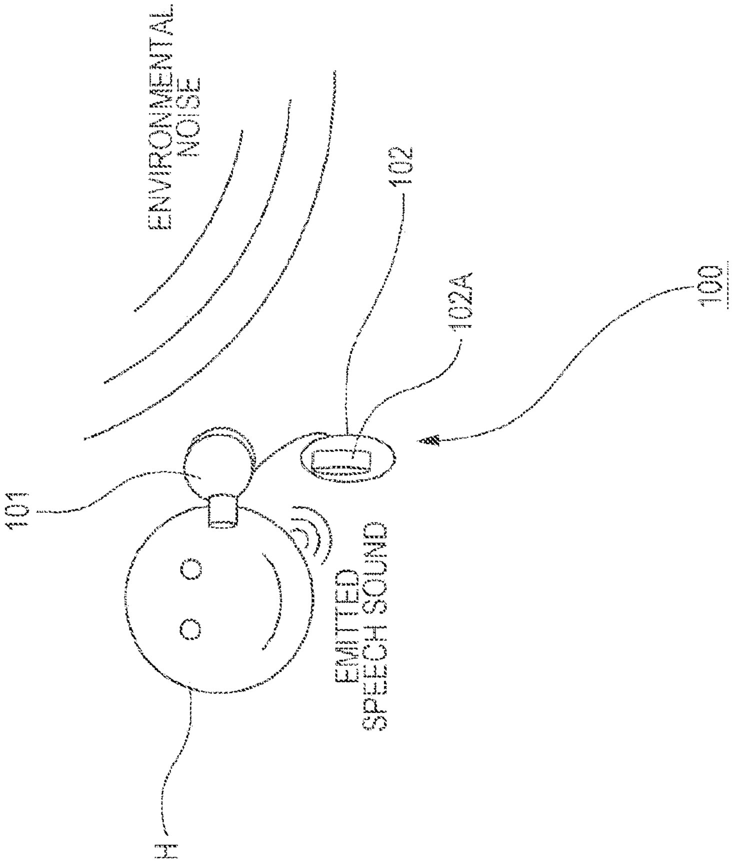
PRIOR ART FIG. 16
FIG. 16 is a diagram showing an example configuration of a conventional earpiece microphone.

FIG. 15 is a diagram showing the configuration of a sound collection system as a sixth embodiment.

The sixth embodiment relates to a combination of a S/N and sound quality improvement technique using an external microphone and a HPF as described above in the third embodiment, and a S/N and sound quality improvement technique using a beam forming process as described above in the second embodiment.

In the sixth embodiment, the side of the attachment unit 1 corresponds to the Lch side, and the side of the attachment unit 3 corresponds to the Rch side, as in the second embodiment.

In FIG. 15, the sound collection system of the sixth embodiment differs from the sound collection system of the second embodiment in that an external microphone 1C is added to the attachment unit 1, an external microphone 3C is added to the attachment unit 3, and a signal processing unit 40 is provided in the place of the signal processing unit 20.

On the side of the attachment unit 3, the external microphone 3C is installed so as to directly collect sound that is generated outside the housing in the same manner as on the side of the attachment unit 1. In this example, the external microphone 3C is also a MEMS microphone.

The configuration of the Lch side of the signal processing unit 40 is the same as that of the signal processing unit 25 of the third embodiment. Specifically, a microphone amplifier 10, an equalizer 11, a LPF 14, and a delay circuit 28 are provided for sound collection signals generated by the internal microphone 1B, and a microphone amplifier 26 and a HPF 27 are provided for sound collection signals generated by the external microphone 1C. An adder 29 then adds sound collection signals transmitted via the respective components.

The Rch side has the same configuration as the above described configuration of the Lch side. Specifically, a microphone amplifier 21, an equalizer 43, a LPF 22, and a delay circuit 44 are provided for sound collection signals generated by the internal microphone 3B, and a microphone amplifier 41 and a HPF 42 are provided for sound collection signals generated by the external microphone 3C. An adder 45 then adds sound collection signals transmitted via the respective components.

Accordingly, the same S/N and sound quality improvement effect as that described above in the second embodiment is achieved for emitted speech voice collection signals on the Rch side.

It should be noted that the filter characteristics of the equalizer 43, the cutoff frequency of the HPF 42, and the delay time of the delay circuit 44 provided on the Rch side may be basically the same as those of the equalizer 11, the HPF 27, and the delay circuit 28, respectively, as long as the attachment unit 1 and the attachment unit 3 have symmetrical configurations.

An amplifier 15 is also provided in the signal processing unit 40. In this case, a monaural received speech signal amplified by the amplifier 15 is supplied to both a speaker 1S and a speaker 3S, as in the second embodiment.

Also, a beam forming unit 23, a noise gate processing unit 12, and a compressor 13 are provided in the signal processing unit 40, as in the second embodiment.

The beam forming unit 23 in this case performs a beam forming process based on a Lch-side sound collection signal obtained by the adder 29 and a Rch-side sound collection signal obtained by the adder 45.

By this beam forming process, the same noise reduction effect (emitted speech voice extraction effect) as that of the beam forming process of the second embodiment is achieved, and, as a result, the S/N ratio of emitted sound collection signals is further improved.

4. Modifications

Although embodiments according to the present technique have been described so far, the present technique is not limited to the above described specific examples.

For example, a LPF and a HPF are used for extracting the voice dominant band components of respective sound collection signals generated by an internal microphone and an external microphone in the above descriptions. However, a band-limiting filter such as a BPF may be used for the extraction.

Also, in the above descriptions, a low-frequency extraction filter unit for extracting the voice dominant band components of sound collection signals generated by an internal microphone, and an equalizing unit for reducing muffled sound are both employed. However, to improve the S/N ratio of emitted speech voice collection signals (to improve sound quality), at least one of those two units should be employed.

Also, in the above descriptions, a sound collection system according to the present technique is used for telephone calls. However, the present technique can be suitably applied to a system for recording collected speech signals.

In the above descriptions, sound collection is monaurally performed. However, in a case where the present technique is applied to the above described recording system, stereo sound collection can also be performed. In that case, the beam forming unit 23 may be excluded from the configuration shown in FIG. 15, for example, and the output of the adder 29 and the output of the adder 45 may be output independently of each other, for example.

Alternatively, a noise gate processing unit 12 and a compressor 13 may be provided for each of the output of the adder 29 and the output of the adder 45, so that sound quality is further improved for each of the Lch transmitted speech signal and the Rch transmitted speech signal.

In the above descriptions, the speakers 1S and 3S are of the BA type, but speakers of a dynamic type or a capacitor type may be used instead.

The internal microphones 1B and 3B and the external microphones 1C and 3C are not particularly limited to certain types, either.

The present technique can also be embodied in the following structures.

(1) An earhole-wearable sound collection device including:

an attachment unit that is designed so that at least a portion thereof can be inserted into an earhole portion, and is designed to form a substantially sealed internal space therein when attached to the earhole portion, the internal space connecting to an ear canal; an internal microphone that is located in the internal space of the attachment unit, and collects speech voice that is emitted by a wearer and propagates through the ear canal when the attachment unit is attached to the earhole portion; and one of a low-frequency extraction filter unit that performs a filtering process on a sound collection signal from the internal microphone, to extract a low-frequency component, and an equalizing unit that performs an equalizing process of a high-frequency emphasizing type on the sound collection signal from the internal microphone.

(2) The earhole-wearable sound collection device of (1), further including: an external microphone that is positioned to collect sound outside the attachment unit; a mid- and high-frequency extraction filter unit that performs a filtering process on a sound collection signal from the external microphone, to extract a mid- and high-frequency component; and an adder that adds the sound collection signal subjected to the filtering process by the mid- and high-frequency extraction filter unit and the sound collection signal subjected to the filtering process by the low-frequency extraction filter unit.

(3) The earhole-wearable sound collection device of (2), further including a delay processing unit that is located between the internal microphone and the adder, and delays the sound collection signal that is from the side of the internal microphone and is to be subjected to the addition by the adder.

(4) The earhole-wearable sound collection device of (1), wherein the attachment unit is a first attachment unit to be attached to one ear of the wearer, and a second attachment unit to be attached to the other ear of the wearer, a first internal microphone is provided as the internal microphone in the internal space of the first attachment unit, a second internal microphone is provided as the internal microphone in the internal space of the second attachment unit, the low-frequency extraction filter unit performs the filtering process on each of a sound collection signal from the first internal microphone and a sound collection signal from the second internal microphone, and the earhole-wearable sound collection device further includes a beam forming unit that performs a beam forming process based on the sound collection signal that is from the first internal microphone and has been subjected to the filtering process by the low-frequency extraction filter unit, and the sound collection signal that is from the second internal microphone and has been subjected to the filtering process by the low-frequency extraction filter unit.

(5) The earhole-wearable sound collection device of (1) to (4), further including at least one of a noise gate processing unit that performs a noise gate process on the sound collection signal from the internal microphone, and a compressor unit that performs a compressor process on the sound collection signal from the internal microphone.

(6) The earhole-wearable sound collection device of (1) to (5), wherein the filter processing characteristics of the low-frequency extraction filter unit are variable.

(7) The earhole-wearable sound collection device of (2) (3), or (5), wherein the filter processing characteristics of the mid- and high-frequency extraction filter unit are variable.

(8) The earhole-wearable sound collection device of (5) to (7), wherein the processing characteristics of at least one of the equalizing unit, the noise gate processing unit, and the compressor unit are variable.

(9) The earhole-wearable sound collection device of (6), further including a control unit that controls switching of the filter processing characteristics of the low-frequency extraction filter unit in accordance with an operation input.

(10) The earhole-wearable sound collection device of (6), further including a control unit that controls switching of the filter processing characteristics of the low-frequency extraction filter unit in accordance with a result of a noise analysis conducted based on a sound collection signal of extraneous noise.

(11) The earhole-wearable sound collection device of (10), wherein the control unit detects a speech voice non-emitted period during which the level of the sound collection signal of extraneous noise is equal to or lower than a predetermined level, and performs the noise analysis based on the sound collection signal in the speech voice non-emitted period.

(12) The earhole-wearable sound collection device of (1) to (11), wherein the low-frequency extraction filter unit and the equalizing unit are provided inside the attachment unit.

(13) A signal processing device including one of a low-frequency extraction filter unit that performs a filtering process on a sound collection signal from an internal microphone to extract a low-frequency component, the internal microphone being located in an internal space of an attachment unit, the attachment unit being designed so that at least a portion thereof can be inserted into an earhole portion, the attachment unit forming the internal space therein when attached to the earhole portion, the internal space connecting to an ear canal and being substantially sealed, the internal microphone collecting speech voice that is emitted by a wearer and propagates through the ear canal when the attachment unit is attached to the earhole portion, and an equalizing unit that performs an equalizing process of a high-frequency emphasizing type on the sound collection signal from the internal microphone.

REFERENCE SIGNS LIST

1, 3 Attachment unit
IA, 3A Earhole insertion portion
IB, 3B Internal microphone
IC, 3C External microphone
IS, 3S Speaker
IV, 3V Internal space
2, 20, 25, 30, 35, 40 Signal processing unit
21, 26, 41 Microphone amplifier
11, 11', 43 Equalizer
12, 12' Noise gate processing unit
13, 13' Compressor
14, 14', 22 LPF (low-pass filter)
15 Amplifier
23 Beam forming unit
27, 27', 42 HPF (high-pass filter)
28, 44 Delay circuit (DELAY)
29, 45 Adder
31, 36 Control unit
32 Memory
32A Mode-processing characteristics correspondence information
32B Analysis results-processing characteristics correspondence information
50 External device

What is claimed is:

1. A signal processing device, comprising:
circuitry configured to:
receive a first sound collection signal from a first microphone of an earhole-wearable sound collection device, wherein
the first microphone is located in the earhole-wearable sound collection device, and
the first sound collection signal is received from the first microphone via an ear canal;
generate a second sound collection signal from a second microphone, wherein the second microphone is located outside the earhole-wearable sound collection device;
output a filtering processed sound collection signal based on a high-pass or a low-pass filtering process performed on one of the first sound collection signal received from the first microphone via the ear canal or the second sound collection signal generated from the second microphone; and
add the filtering processed sound collection signal to the first sound collection signal or the second sound collection signal.

2. The signal processing device according to claim 1, wherein the first microphone is in a space of an earhole that is sealed off from outside.

3. The signal processing device according to claim 2, wherein
the space connects to the ear canal, and
the circuitry is further configured to equalize based on a digital signal process.

4. The signal processing device according to claim 1, wherein the first microphone is a micro-electro mechanical systems (MEMS) microphone.

5. The signal processing device according to claim 1, wherein the second microphone is a micro-electro mechanical systems (MEMS) microphone.

6. A signal processing method, comprising:
receiving a first sound collection signal from a first microphone of an earhole-wearable sound collection device, wherein
the first microphone is located in the earhole-wearable sound collection device, and
the first sound collection signal is received from the first microphone via an ear canal;
generating a second sound collection signal from a second microphone, wherein the second microphone is located outside the earhole-wearable sound collection device;
outputting a filtering processed sound collection signal based on a high-pass or a low-pass filtering process performed on one of the first sound collection signal received from the first microphone via the ear canal or the second sound collection signal generated from the second microphone; and
adding the filtering processed sound collection signal to the first sound collection signal or the second sound collection signal.

* * * * *